US011368891B2

(12) United States Patent
Ioffe et al.

(10) Patent No.: US 11,368,891 B2
(45) Date of Patent: Jun. 21, 2022

(54) PRIMARY CELL SWITCHING IN NON-SIMULTANEOUS UPLINK CARRIER AGGREGATION SCENARIOS

(71) Applicant: Apple Inc., Cupertino, CA (US)

(72) Inventors: Anatoliy Sergey Ioffe, Redwood City, CA (US); Alexander Sayenko, Munich (DE); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 109 days.

(21) Appl. No.: 16/994,161

(22) Filed: Aug. 14, 2020

(65) Prior Publication Data

US 2021/0250833 A1 Aug. 12, 2021

Related U.S. Application Data

(60) Provisional application No. 62/975,461, filed on Feb. 12, 2020.

(51) Int. Cl.
*H04W 36/18* (2009.01)
*H04W 36/06* (2009.01)
(Continued)

(52) U.S. Cl.
CPC .......... *H04W 36/18* (2013.01); *H04W 36/06* (2013.01); *H04W 56/0005* (2013.01);
(Continued)

(58) Field of Classification Search
CPC . H04W 36/18; H04W 36/06; H04W 56/0005; H04W 56/0045; H04W 72/0413;
(Continued)

(56) References Cited

U.S. PATENT DOCUMENTS 8,554,226 B2   10/2013  Laroia et al.
10,477,457 B2  11/2019  Park et al.
(Continued)

FOREIGN PATENT DOCUMENTS

KR   101095777 B1   12/2011
WO   2019159096 A1   8/2019

OTHER PUBLICATIONS

5G; NR; User Equipment (UE) radio transmission and reception; Part 1: Range 1 Standalone (#GPP TS 38.101-1 version 15.3.0 Release 15)* European Telecommunications Standards Institute (ETSI), Oct. 18, 2018.
(Continued)

*Primary Examiner* — Marisol Figueroa
(74) *Attorney, Agent, or Firm* — Fletcher Yoder PC

(57) ABSTRACT

The present disclosure relates to systems and methods for operating transceiver circuitry to communicate signals on various frequency ranges based on primary cell and/or secondary cell assignments. A controller associated with the transceiver circuitry may operate a receiver to receive a handover initiation packet using a first frequency range as a primary cell from a base station. The controller may adjust the receiver and a transmitter to use a second frequency range as the primary cell, to adjust the receiver and the transmitter to detach from the first frequency range as the primary cell, and to reset information corresponding to the first frequency range to enable attachment of the first frequency range to a secondary cell.

21 Claims, 11 Drawing Sheets

(51) Int. Cl.
*H04W 72/04* (2009.01)
*H04W 56/00* (2009.01)
*H04W 74/08* (2009.01)

(52) U.S. Cl.
CPC ... *H04W 56/0045* (2013.01); *H04W 72/0413* (2013.01); *H04W 74/0833* (2013.01)

(58) Field of Classification Search
CPC ......... H04W 74/0833; H04W 36/0069; H04W 36/14; H04W 72/0453; H04L 5/001
See application file for complete search history.

(56) References Cited

U.S. PATENT DOCUMENTS

| | | | |
|---|---|---|---|
| 10,993,151 | B2* | 4/2021 | Sadek ................. H04L 1/00 |
| 2010/0135238 | A1 | 6/2010 | Sadri et al. |
| 2013/0197850 | A1 | 8/2013 | Yu et al. |
| 2017/0347270 | A1 | 11/2017 | Iouchi et al. |
| 2018/0014251 | A1 | 1/2018 | Sambhwani et al. |
| 2018/0199257 | A1* | 7/2018 | Kim ................. H04W 36/0027 |
| 2018/0301814 | A1 | 10/2018 | Zhang et al. |
| 2019/0182000 | A1 | 6/2019 | Futaki |
| 2019/0182870 | A1 | 6/2019 | Shih et al. |
| 2019/0253945 | A1 | 8/2019 | Paladugu et al. |
| 2019/0281598 | A1 | 9/2019 | Almalfouh et al. |
| 2019/0297547 | A1 | 9/2019 | Tsai et al. |
| 2019/0297620 | A1 | 9/2019 | Tian et al. |
| 2019/0313460 | A1 | 10/2019 | Tsai |
| 2019/0357292 | A1 | 11/2019 | Cirik et al. |
| 2019/0363843 | A1 | 11/2019 | Gordaychik |
| 2019/0364602 | A1 | 11/2019 | Yi et al. |
| 2019/0373663 | A1 | 12/2019 | Yu et al. |
| 2019/0373667 | A1 | 12/2019 | Jeon et al. |
| 2020/0178261 | A1 | 6/2020 | Ioffe et al. |

OTHER PUBLICATIONS

Apple, Inc., "Further considerations on beam management enhancement," 3GPP TSG RAN WG1 #97, May 13, 2019, 7 pages.
Apple, Inc., "WF on non-contiguous UL CA in FR2," 3GPP TSG-RAN4 Meeting #92bis, Oct. 14, 2019, 7 pages.
Apple, Inc., "Non-simultaneous UL for non-contiguous UL CA in FR2," 3GPP TSG-RAN4 Meeting #94-e, Feb. 24, 2020, 5 pages.
Nokia Shanghai Bell, "NR RF requirements for FR2," 3GPP TSG RAN Meeting #83, Mar. 18, 2019, 4 pages.
Samsung, "New WID: Further enhancements on MIMO for NR," 3GPP TSG RAN Meeting #86, Dec. 9, 2019, 5 pages.
Advanced Pro LTE, "Release 17 package for RAN," 3GPP, 2017, 9 pages.
Qualcomm Incorporated, "TX Diversity and related work in RAN4," 3GPP TSG-RAN #87-e, Mar. 16, 2020, 5 pages.

* cited by examiner

PRIMARY CELL SWITCHING IN NON-SIMULTANEOUS UPLINK CARRIER AGGREGATION SCENARIOS

CROSS-REFERENCE TO RELATED APPLICATIONS

This application claims the benefit of U.S. Provisional Application No. 62/975,461, "PRIMARY CELL SWITCHING IN NON-SIMULTANEOUS UPLINK CARRIER AGGREGATION SCENARIOS," filed Feb. 12, 2020, which is herein incorporated by reference in its entirety for all purposes.

BACKGROUND

The present disclosure relates generally to electronic devices, and more particularly, to electronic devices that utilize radio frequency signals, transmitters, and receivers for wireless communication.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Wireless communication systems are rapidly growing in usage. In recent years, wireless devices such as smartphones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Transmitters and/or receivers may be included in various electronic devices to enable communication over wireless networks between user equipment (e.g., user electronic devices, transmitting or receiving electronic devices) and core networks on said wireless networks, deployed through a variety of technologies including but, not limited to, access network base stations, such as an eNodeB (eNB) for Long-Term Evolution (LTE) (e.g., $4^{th}$ Generation (4G)) access networks and/or a next generation NodeB (gNB) for New Radio (NR (e.g., $5^{th}$ Generation (5G)) access networks. In some user equipment (UE), a transmitter and a receiver are combined to form a transceiver. Transceivers may transmit and/or receive wireless signals, such as radio frequency (RF) signals indicative of data, by way of an antenna coupled to the transceiver. Indeed, some UE include transmit circuitry and/or receive circuitry for communicating on dual networks, such as circuitry for communicating on two or more access networks (e.g., $2^{nd}$ Generation (2G) access networks, $3^{rd}$ Generation (3G) access networks, 4G access networks, 5G access networks, or the like). Thus, some radio operators for cellular networks and/or communication networks may provide services through a combination of radio access nodes (e.g., base stations) able to communicate with UE using one or more networks. For the case where a radio operator may communicate using a UE over a 4G/LTE network at a first time and a 5G/NR network at a second time, the radio operator may sometimes switch a primary serving cell communicating with the UE between the networks. For example, the network operator may switch from communicating with the UE using a primary serving cell of the first network (e.g., 4G/LTE) to communicating with the UE using a primary serving cell of the second network (e.g., 5G/NR).

Recent releases (e.g., Release 16 (Rel-16), Release 17 (Rel-17)) of the New Radio standard relating to 5G communications apply to frequency range 2 (FR2), which includes frequency bands from 24.25 Gigahertz (GHz) to 52.6 GHz, and describe additional enhancements to the LTE mobile standard managed by the Third Generation Partnership Project (3GPP). These additional enhancements may include integration of orthogonal frequency division multiplexing (OFDM) techniques with a cyclic prefix (CP) (CP-OFDM), beamforming, multiple-input multiple-output (MIMO) antenna technology, carrier aggregation (CA) operations, and the like. Indeed, these standards describe intra-band non-contiguous and inter-band uplink CA operation scenarios in FR2, where CA operations may enable the UE to receive communications (e.g., downlink communications) transmitted from multiple base stations using different carrier signal frequency ranges per base station, where intra-band non-contiguous and inter-band refer to frequency range arrangements.

Recent discussions of standard development groups have proposed non-simultaneous uplink (NSU) switching operations for inclusion in the standards. Such inclusions may limit a network provider's ability to receive uplink communications from user equipment on two different component carriers at a same time and/or in parallel. To manage NSU operations, a network provider may perform switching between component carriers to enable the component carriers time to perform non-simultaneous uplink operations or receive uplinked data at different times.

In some cases, the switching operations may be used to selectively increase or decrease an amount of bandwidth (e.g., a frequency range) allocated between a respective base station of the network provider and user equipment. Switching in additional bandwidth parts (BWP) may permit a temporary increase in a size of a bandwidth allocation, while switching out may decrease the size of the bandwidth allocation.

There are several benefits of non-simultaneous uplink (UL) for intra-band carrier aggregation in FR2: the retention of the same link budget as the contiguous UL CA case in Release 15 (Rel-15) of the New Radio standard, the reduction in complexity of the UE RF architecture to support a band combination with greater complexity, and the flexibility for UL load balancing across a non-contiguous spectrum. The maximum power reduction (MPR) specification for UL intra-band contiguous CA with contiguous and non-contiguous allocation cases may be a useful example. The Quadrature Phase Shift Keying (QPSK) Discrete Fourier Transform spread (DFT-s) Orthogonal Frequency Division Multiplexing (OFDM) MPR requirement for 400 MHz aggregate BW is 5.0 dB, while non-contiguous allocations can potentially increase MPR by 2.0 dB. In addition to increased MPR, simultaneous non-contiguous UL allocations reduce a Power Spectral Density (PSD) level received by the base station, further exacerbating the UL link budget. In an example with two non-contiguous UL CCs of equal bandwidth and full allocation, the non-simultaneous UE may have a 3 dB advantage over the simultaneous UE in terms of the received PSD level at the base station.

In the scenario of wide separation between UL carriers (up to 1400 MHz), more MPR may be permitted for non-contiguous UL CA. With such an impact on an already difficult UL link budget, non-simultaneous UL can enable a practical deployment of the UL intra-band NC CA feature in FR2. It is also noted that two power amplifiers associated with simultaneous uplink operations may generate reverse intermodulation (IMD) products, where a relatively strongest coupling mechanism is expected to be at the respective antenna arrays. If a design uses co-located arrays, as has been presumed previously in multi-band frameworks, isolation between the antenna arrays is not expected to be large enough to reduce or eliminate the intermodulation products affecting the uplink operations. Furthermore, if the design uses non-co-located arrays, or even separate antenna panels for the UL component carriers, the design may not support some CA combinations (such as in the n258 and n257 frequency band cases) and/or the design may be uncompliant with Rel-16 specifications (e.g., since multi-panel operation is no longer in the scope of Rel-16 Radio Layer 1 (RAN1) specification work and has not been started as part of Rel-17 RAN1 work). Thus, with a strong coupling mechanism for reverse IMD, the inter-band UL CA scenario in FR2 begins to resemble similar challenges previously experienced with band 41/*n*41 EN-DC. In addition to a desire to increase MPR to reduce magnitude of the intermodulation products, simultaneous inter-band UL allocations may reduce PSD level received by the base station, further exacerbating the UL link budget.

Despite these improvements, however, the proposed BWP switching approaches are applicable to a mere subset of possible CA dual connectivity (CA-DC) configurations, such as switching between secondary cells of dual networks (e.g., 4G/LTE networks and 5G/NR networks), and not others, such as switching between primary cells of the dual networks. Accordingly, bandwidth may not be efficiently distributed between user equipment as it relates to primary cells, as some user equipment may be using less than their fixed allocated bandwidth when communicating with a base station, while other user equipment may benefit from being allocated more than their fixed allotted bandwidth.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Previous bandwidth part (BWP) switching techniques between two communication networks, such as between a 4G/LTE network and a 5G/NR network, may merely apply to switching between secondary serving cells (Scells) of the dual networks. It may be desired to implement BWP switching operations that enable switching between component carriers associated with a primary serving cell (Pcell) or a primary-secondary serving cell (PScell). With the scope for UL inter-band CA in FR2 removed from Rel-16, it is anticipated that such an objective will be included in the Rel-17 FR2 RF work. Indeed, dynamically adjusting which frequency ranges are used for Pcells, PScells, and Scells may enable flexible allocation of bandwidths and/or amounts of resources to user equipment. This may improve flexibility of a network by not restricting a network provider to keep a bandwidth allocated to the user equipment constant. In particular, some user equipment may, at certain times, be using less than their allocated bandwidth, while other user equipment may benefit from more than their allocated bandwidth. Dynamically allocating bandwidth by reallocating cell assignments between user equipment may more efficiently distribute bandwidth to meet or address the demands of the network, which may result in an overall reduction of resources used by the network provider to deploy the network. Indeed, in an example with two inter-band UL CCs of equal bandwidth and full allocation, user equipment implementing non-simultaneous uplink (NSU) operations of user equipment may benefit from a 3 dB advantage over user equipment implementing simultaneous uplink in terms of the received PSD level at its corresponding base station. Thus, applying NSU feature to inter-band UL CA in FR2 may improve user equipment operations, as detailed further herein, and thus is expected to be included as part of Rel-17 FR2 RF enhancement standards.

Indeed, during operation, user equipment consume relatively high amounts of power during FR2 operation, and thus power savings techniques are valuable enhancement objectives, including dynamic allocation of bandwidth. One technique the user equipment may use is to reduce or increase the number of RX antenna elements (e.g., for DL operations) and/or TX antenna elements (e.g., for UL operations) based on operating conditions, thereby dynamically reducing power consumption levels when less bandwidth is able to be used to support communication of the user equipment (and increasing power consumption levels when additional bandwidth is requested for a communication).

As an example, user equipment may default to using two antenna elements. However, when requested by the base station and/or its own control system, the user equipment may be operated to use four antenna elements for uplink of a relatively larger communication. The user equipment may be returned to the lower power consumption, default mode, once the communication is completed, thereby overall reducing power consumption based on operating conditions.

Beam correspondence performance of user equipment may further benefit from enhancements of measurement report procedures, and aspects related to "dynamic signaling" from the user equipment to the core network to improve beam correspondence performance may be of interest. A gNB can control a sounding reference signal (SRS) TX beam of a user equipment through the spatial relation configuration, which defines the TX beam relative to a reference signal (RS), where this information may be transmitted to the user equipment at onset of communication with the user equipment. In the absence of a configured spatial relation that is indicated to the user equipment, there may be no gNB/UE coordination on which the user equipment TX beam is able to sweep. Beam sweeping operations may improve (e.g., reduce in total time used to complete) if beam sweep for he TX beam were to initialize based on a RX beam since, for example, the user equipment may be provided with a starting point upon which to start the beam sweeping.

Beam correspondence at the user equipment may be desirable to improve beamforming efficiency. However, beam correspondence at the user equipment may be achieved within a tolerance given the complexity of RF front end design and the associated calibrations. RAN4's studies on the beam correspondence requirement clearly indicate that the deviation from ideal beam correspondence (i.e., non-zero tolerance) may be significant. User equipment that selects a TX beam using a previously determined RX beam correspondence may not point in the optimal direction and thus suffer from some beam correspondence (BC) error. To mitigate the beam correspondence error, the user equipment may be programmed with a small set (e.g. 2) of SRS resources with the same "spatial relation" to the reference RS, such that some SRS resources may use different TX beams than those determined through the RX beam correspondence. By sweeping this expanded set of SRS resources, the gNB may find the relatively more suitable user equipment TX beam and signal the selection to the user equipment in response to the discovery. This mechanism may resolve at least some error stemming from beam correspondence at the cost of a limited beam sweep around the candidate direction, and may improve the efficiency of UL SRS sweeping by reducing SRS overhead and/or avoiding RX beam switching at the network. It is noted that these indications, among other indications, may be included in reports exchanged between the user equipment and the base station.

Keeping the foregoing in mind, user equipment may indicate its capability to perform switching operations associated with a Pcell, PScell, and/or Scell change to a network provider, such as a network provider of both a first network type and of a second network type. In response to receiving this information, the network provider may cause one or more base stations to initiate a "make before break" handover (MBB handover) and/or a random-access channel-less (RACH-less) handover between the serving cells. When performing the switch, the network provider may repurpose previously determined frequency ranges that were used to communicate with the user equipment using a first Pcell assignment when communicating with the user equipment using a different Pcell assignment. Reusing previous frequency assignments and/or configurations may reduce an amount of time spent performing the BWP switching overall, thus improving deployment of the switching in addition to increasing flexibility of the BWP switching operations. In some cases, the switching operations associated with the MBB handover or the RACH-less handover may be performed in addition to a defined sequence of operations that confirm switching operations are being performed without having a network provider exchange intermediate confirmation messages with the user equipment.

Various embodiments may be used to deploy the disclosed systems. For example, a method performed according to the discussions herein may involve communicating with a base station using a first frequency range assigned as a primary cell associated with bandwidth parts switching and receiving a handover initiation packet from the base station using the first frequency range. The method may include assigning a second frequency range as the primary cell based on a parameter indicated in the handover initiation packet in response to receiving the handover initiation packet. The method may include receiving a control packet from the base station using the second frequency range as the primary cell and assigning the first frequency range as a secondary cell in response to receiving the control packet from the base station. The method may also include communicating with the base station using the first frequency range as the secondary cell and the second frequency range as the primary cell.

In some embodiments, user equipment may include a transmitter, a receiver, one or more processors communicatively coupled to the transmitter and the receiver; and one or more memory devices. The one or more memory devices may include instructions that, when executed by the one or more processors, cause the one or more processors to operate the receiver to receive a handover initiation packet using a first frequency range as a primary cell from a base station. The instructions may also cause the one or more processors to adjust the receiver and the transmitter to use a second frequency range as the primary cell, to operate the transmitter to transmit a random access channel packet to the base station using the second frequency range as the primary cell, and to adjust the receiver and the transmitter to detach from the first frequency range as the primary cell and reset, in a transport layer, information corresponding to the first frequency range. The instructions may also cause the one or more processors to operate the receiver to receive a random access response packet using a second frequency range as the primary cell from the base station, and to operate the transmitter to transmit a handover completion notification to the base station in response to receiving the random access response packet using the second frequency range as the primary cell.

Furthermore, in some embodiments, user equipment may include a transmitter, a receiver, one or more processors communicatively coupled to the transmitter and the receiver; and one or more memory devices. The one or more memory devices may include instructions that, when executed by the one or more processors, cause the one or more processors to operate the receiver to receive a handover initiation packet using a first frequency range as a primary cell from a base station, and, in response to receiving the handover initiation packet, to perform a defined sequence of operations. The defined sequence of operations may include adjusting the receiver and the transmitter to detach from the first frequency range as the primary cell and reset, in a transport layer, information corresponding to the first frequency range and adjusting the receiver and the transmitter to configure circuitry to use a second frequency range as the primary cell. The instructions may cause the one or more processors to operate the receiver to receive a control packet using the second frequency range as the primary cell from the base station, and to adjust the receiver and the transmitter to use the first frequency range as a secondary cell at least in part by assigning, in the transport layer, the first frequency range as the secondary cell in response to the control packet.

Moreover, in some embodiments, user equipment may include a transmitter, a receiver, one or more processors communicatively coupled to the transmitter and the receiver; and one or more memory devices. The one or more memory devices may include instructions that, when executed by the one or more processors, cause the one or more processors to operate the receiver to receive a handover initiation packet using a first frequency range as a primary cell from a base station, and to adjust the receiver and the transmitter to detach from the first frequency range as the primary cell and reset, in a transport layer, information corresponding to the first frequency range. The instructions may cause the one or more processors to, after detachment in the transport layer, adjust the receiver and the transmitter to use a second frequency range as the primary cell, and operate the transmitter to transmit a handover completion notification to the base station using the second frequency range as the primary cell. The instructions may cause the one or more processors to operate the receiver to receive a control packet using the second frequency range as the primary cell from the base station, and adjust the receiver and the transmitter to use the first frequency range as a secondary cell at least in part by assigning, in the transport layer, the information corresponding to the first frequency range as the secondary cell in response to the control packet.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
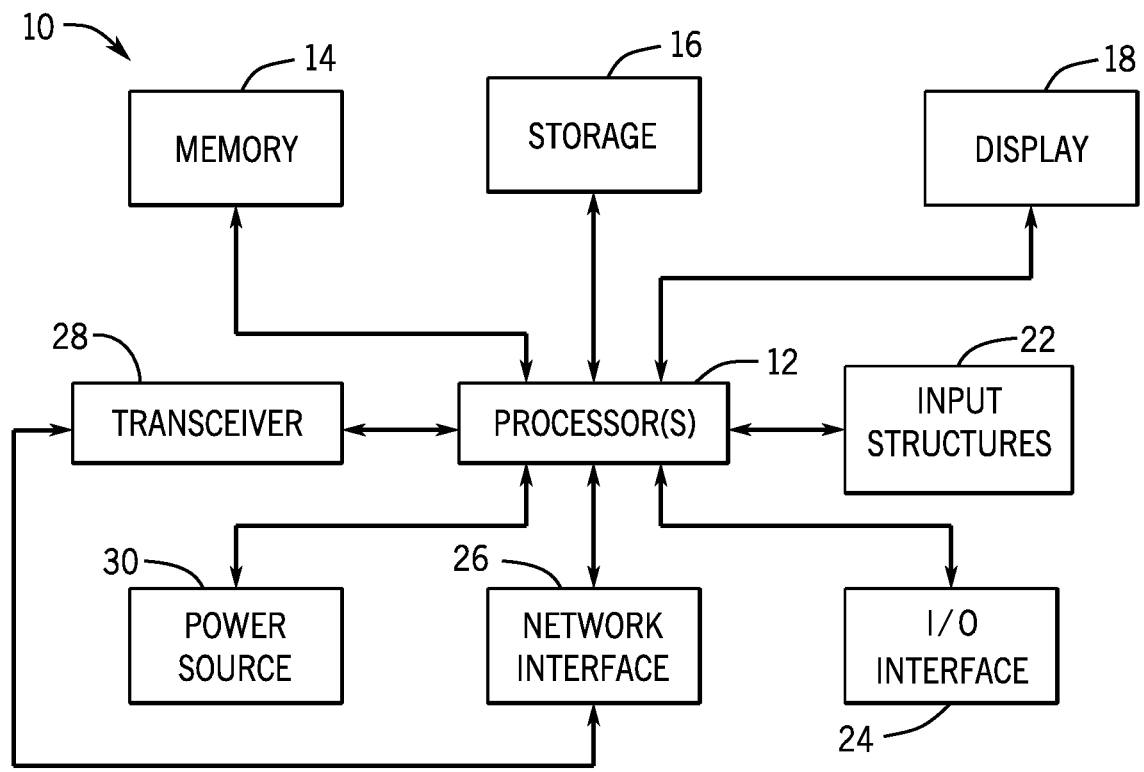
FIG. 1 is a schematic block diagram of an electronic device including a transceiver, in accordance with an embodiment of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Various techniques are disclosed that may adjust an operating frequency range of an electronic device, such as the operating frequency range used to receive and/or transmit data to a network provider. The network provider may use component carriers (e.g., frequency blocks or sub-ranges) to wirelessly couple a base station to user equipment (e.g., electronic device), and different component carriers may transmit different portions of a communication to or from the user equipment to temporarily increase a bandwidth to the user equipment. These temporary assignments of component carriers may benefit from techniques that enable the network provider to switch a component carrier assigned as a primary cell (Pcell) and/or primary-secondary cell (PScell) to another component carrier assigned as another Pcell and/or PScell, when, for example, both component carriers are associated with frequencies between 24 Gigahertz (GHz) and 53 GHz, designated as the Frequency Range 2 (FR2) frequency range. That said, these operations may be applicable to any suitable range of frequencies and may be referred to as Pcell switching operations.

The disclosed techniques may apply to a variety of electronic devices. It is noted that a channel may be a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions). For example, Long-Term Evolution (LTE) networks may support scalable channel bandwidths from 1.4 Megahertz (MHz) to 20 MHz. New Radio (NR) networks may support scalable channel bandwidths from 5 MHz to 400 MHz. In contrast, wireless local area network (WLAN) channels may be 22 MHz wide, while BLUETOOTH® channels may be 1 MHz wide. Other protocols and standards may include different definitions of channels. Furthermore, some standards may define and use multiple types of channels, such as different channels for uplink or downlink and/or different channels for different uses such as data, control information, or the like. Also, as used herein, the term "band" has the full breadth of its ordinary meaning, and at least includes a section of spectrum (e.g., radio frequency spectrum) in which channels are used or set aside for the same purpose.

Pcell switching may occur based on a make-before-break process, based on a random-access channel notification (RACH)-less handover process, or based on a defined sequence of operations to be used for the Pcell switching, as elaborated upon herein. These processes bring certain advantages to operation, as is described herein. With the foregoing in mind, a general description of suitable electronic devices that may include such processing circuitry is provided below.

Turning first to FIG. 1, an electronic device 10 according to an embodiment of the present disclosure may include, among other things, one or more of processor(s) 12, memory 14, nonvolatile storage 16, a display 18, input structures 22, an input/output (I/O) interface 24, a network interface 26, a transceiver 28, and a power source 30. The various functional blocks shown in FIG. 1 may include hardware elements (including circuitry), software elements (including computer code stored on a computer-readable medium) or a combination of both hardware and software elements. Furthermore, a combination of elements may be included in tangible, non-transitory, and machine-readable medium that include machine-readable instructions. The instructions may be executed by the processor 12 and may cause the processor 12 to perform operations as described herein. It should be noted that FIG. 1 is merely one example of a particular embodiment and is intended to illustrate the types of elements that may be present in the electronic device 10.

Figure 2:
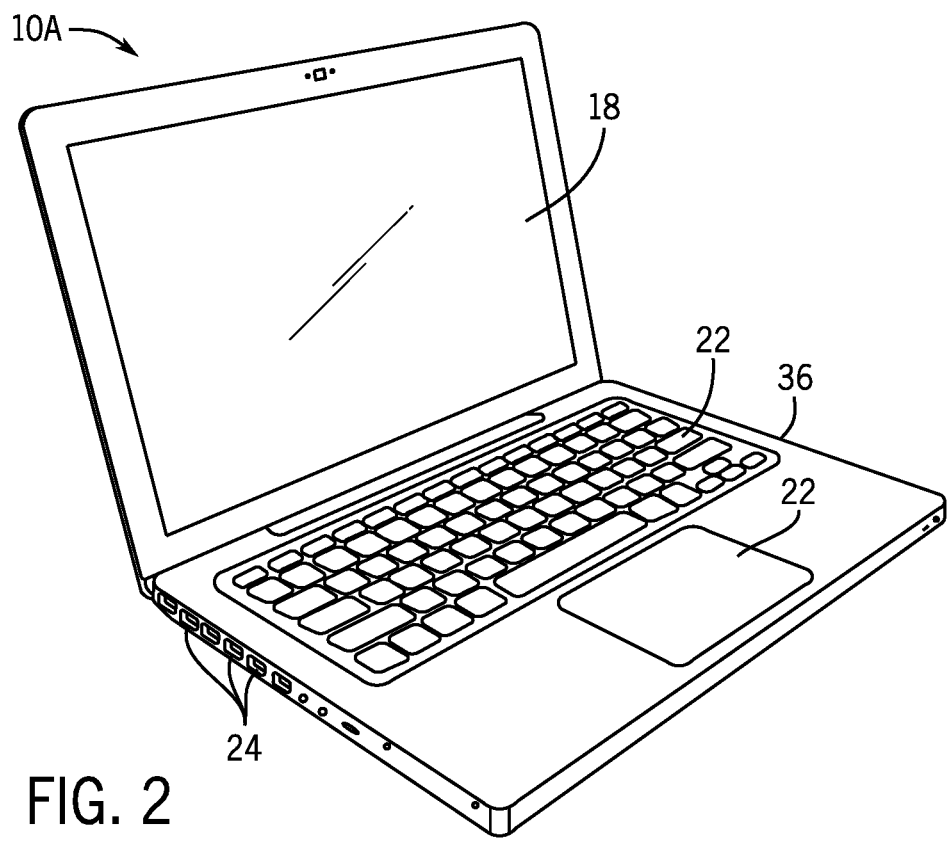
FIG. 2 is a perspective view of a notebook computer representing a first embodiment of the electronic device of FIG. 1.
Figure 4:
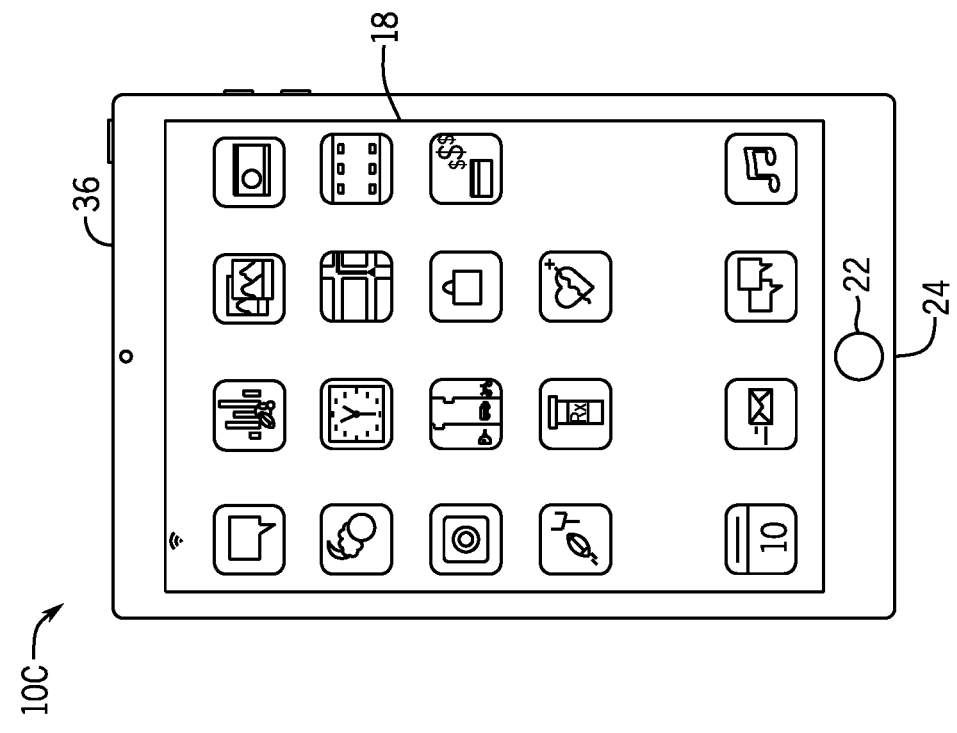
FIG. 4 is a front view of another handheld device representing a third embodiment of the electronic device of FIG. 1.
Figure 3:
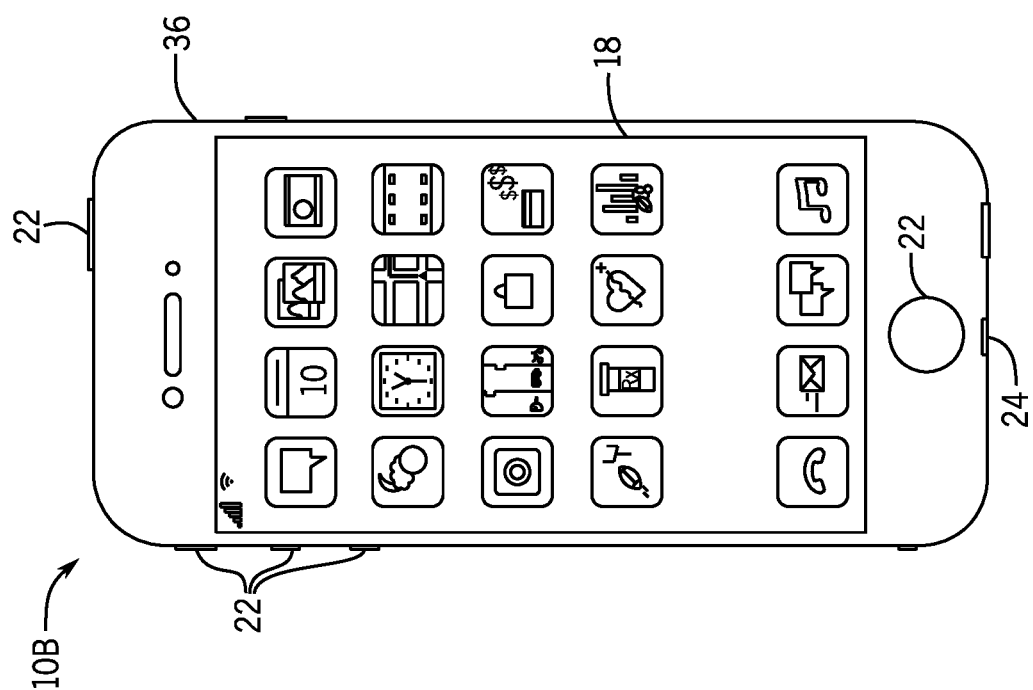
FIG. 3 is a front view of a handheld device representing a second embodiment of the electronic device of FIG. 1.
Figure 5:
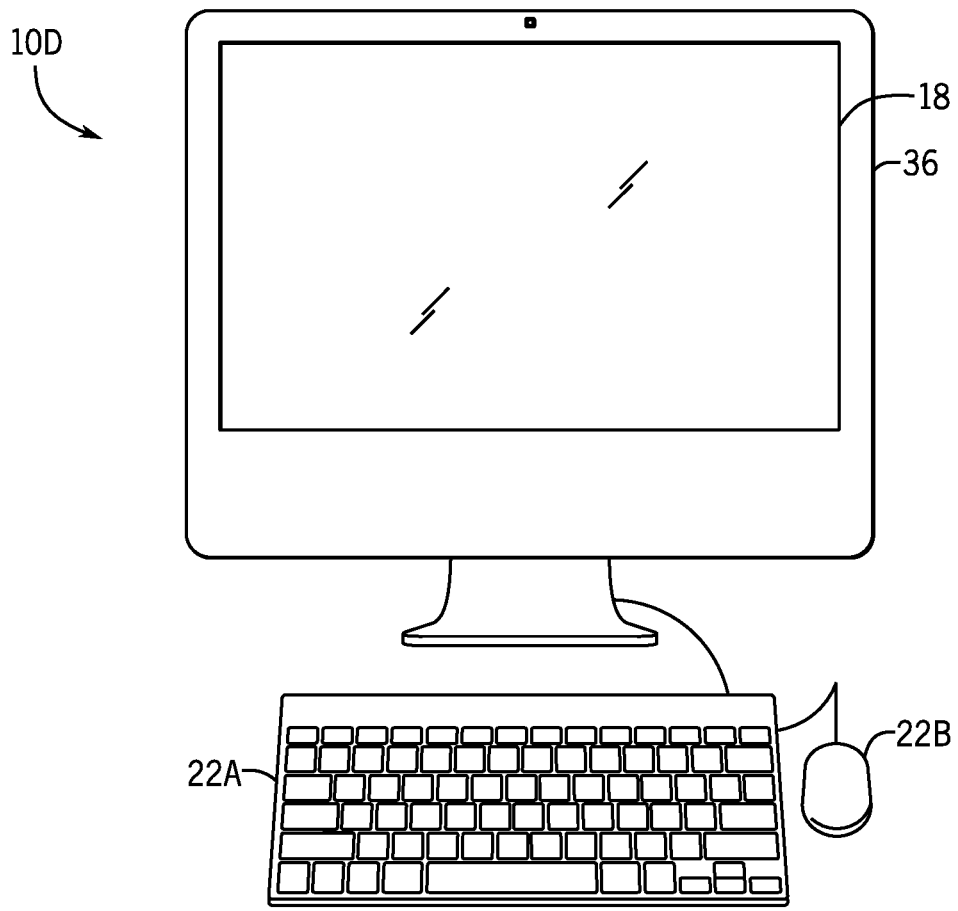
FIG. 5 is a front view of a desktop computer representing a fourth embodiment of the electronic device of FIG. 1.
Figure 6:
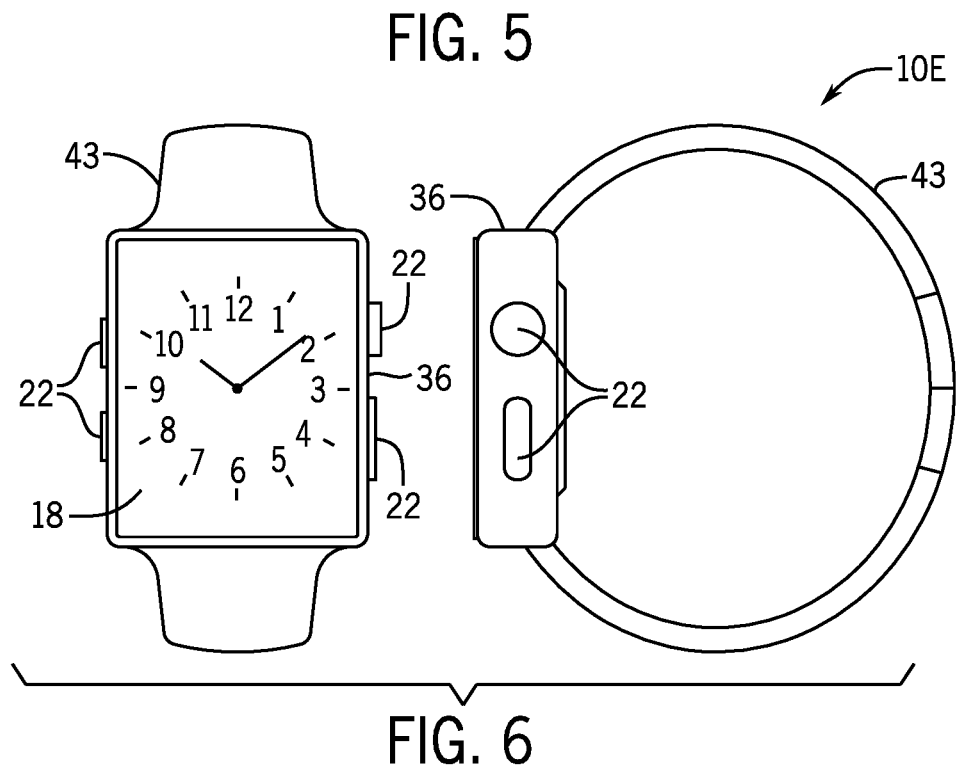
FIG. 6 is a front view and side view of a wearable electronic device representing a fifth embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor 12 may couple with the memory 14 and the nonvolatile storage 16 to perform various algorithms. Such programs or instructions executed by the processor 12 may be stored in any suitable article of manufacture that includes one or more tangible, computer-readable media at least collectively storing the instructions or processes, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions executable by the processor 12 to enable the electronic device 10 to provide various functionalities.

In certain embodiments, the display 18 may be a liquid crystal display (LCD) or a digital micromirror display (DMD), one or more organic light emitting diode (OLED) displays, or some combination these, which may enable users to view images generated by the electronic device 10. In some embodiments, the display 18 may include a touch screen, which may facilitate user interaction with a user interface of the electronic device 10.

In some cases, the one or more processors 12 may operate circuitry to input or output data generated by the electronic device 10. For example, the one or more processors 12 may control and/or operate the memory 14, the nonvolatile storage 16, display 18, input structures 22, an input/output (I/O interface) 24, a network interface 26, a transceiver 28, a power source 30, or the like to perform operations of the electronic device 10 and/or to facilitate control of the operations of the electronic device. In particular, the one or more processors 12 may generate control signals for operating the transceiver 28 to transmit data on one or more communication networks.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a $3^{rd}$ generation (3G) cellular network, $4^{th}$ generation (4G) cellular network, Long-Term Evolution (LTE) cellular network, long term evolution license assisted access (LTE-LAA) cellular network, $5^{th}$ generation (5G) cellular network, or New Radio (NR) cellular network. The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

In some embodiments, the electronic device 10 communicates over the aforementioned wireless networks (e.g., 4G, LTE®, 5G) using the transceiver 28. The transceiver 28 may include circuitry useful in both wirelessly receiving and wirelessly transmitting signals (e.g., data signals, wireless data signals, wireless carrier signals, RF signals), such as a transmitter and/or a receiver. Indeed, in some embodiments, the transceiver 28 may include a transmitter and a receiver combined into a single unit, or, in other embodiments, the transceiver 28 may include a transmitter separate from a receiver. The transceiver 28 may transmit and receive RF signals to support voice and/or data communication in wireless applications in the networks listed above or any suitable network, such as PAN networks, WLAN networks, UWB networks, and the like. As further illustrated, the electronic device 10 may include the power source 30. The power source 30 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers) and/or those that are generally used in one place (such as desktop computers, workstations and/or servers). In certain embodiments, the electronic device 10 in the form of a computer may be a model of a MACBOOK®, MACBOOK® PRO, MACBOOK AIR®, IMAC®, MAC® mini, or MAC PRO® available from Apple Inc. of Cupertino, Calif. By way of example, the electronic device 10, taking the form of a notebook computer 10A, is illustrated in FIG. 2 in accordance with one embodiment of the present disclosure. The notebook computer 10A may include a housing or the enclosure 36, the display 18, the input structures 22, and ports associated with the I/O interface 24. In one embodiment, the input structures 22 (such as a keyboard and/or touchpad) may enable interaction with the notebook computer 10A, such as starting, controlling, or operating a graphical user interface (GUI) and/or applications running on the notebook computer 10A. For example, a keyboard and/or touchpad may facilitate user interaction with a user interface, GUI, and/or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an IPOD® or IPHONE® available from Apple Inc. of Cupertino, Calif. The handheld device 10B may include the enclosure 36 to protect interior elements from physical damage and to shield them from electromagnetic interference. The enclosure 36 may surround the display 18. The I/O interface 24 may open through the enclosure 36 and may include, for example, an I/O port for a hard wired connection for charging and/or content manipulation using a connector and protocol, such as the Lightning connector provided by Apple Inc. of Cupertino, Calif., a universal serial bus (USB), or other similar connector and protocol.

The input structures 22, in combination with the display 18, may enable user control of the handheld device 10B. For example, the input structures 22 may activate or deactivate the handheld device 10B, navigate a user interface to a home screen, present a user-editable application screen, and/or activate a voice-recognition feature of the handheld device 10B. Other of the input structures 22 may provide volume control, or may toggle between vibrate and ring modes. The input structures 22 may also include a microphone to obtain a user's voice for various voice-related features, and a speaker to enable audio playback. The input structures 22 may also include a headphone input to enable input from external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an IPAD® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, and/or may be a standalone media player or video gaming machine. By way of example, the computer 10D may be an IMAC®, a MACBOOK®, or other similar device by Apple Inc. of Cupertino, Calif. It should be noted that the computer 10D may also represent a personal computer (PC) by another manufacturer. The enclosure 36 may protect and enclose internal elements of the computer 10D, such as the display 18. In certain embodiments, a user of the computer 10D may interact with the computer 10D using various peripheral input devices, such as keyboard 22A or mouse 22B (e.g., input structures 22), which may operatively couple to the computer 10D.

Similarly, FIG. 6 depicts a wearable electronic device 10E representing another embodiment of the electronic device 10 of FIG. 1. By way of example, the wearable electronic device 10E, which may include a wristband 43, may be an APPLE WATCH® by Apple Inc. of Cupertino, Calif. However, in other embodiments, the wearable electronic device 10E may include any wearable electronic device such as, a wearable exercise monitoring device (e.g., pedometer, accelerometer, heart rate monitor), or other device by another manufacturer. The display 18 of the wearable electronic device 10E may include a touch screen version of the display 18 (e.g., LCD, OLED display, active-matrix organic light emitting diode (AMOLED) display, and so forth), as well as the input structures 22, which may facilitate user interaction with a user interface of the wearable electronic device 10E. In certain embodiments, as previously noted above, each embodiment (e.g., notebook computer 10A, handheld device 10B, handheld device 10C, computer 10D, and wearable electronic device 10E) of the electronic device 10 may include the transceiver 28.

Figure 7:
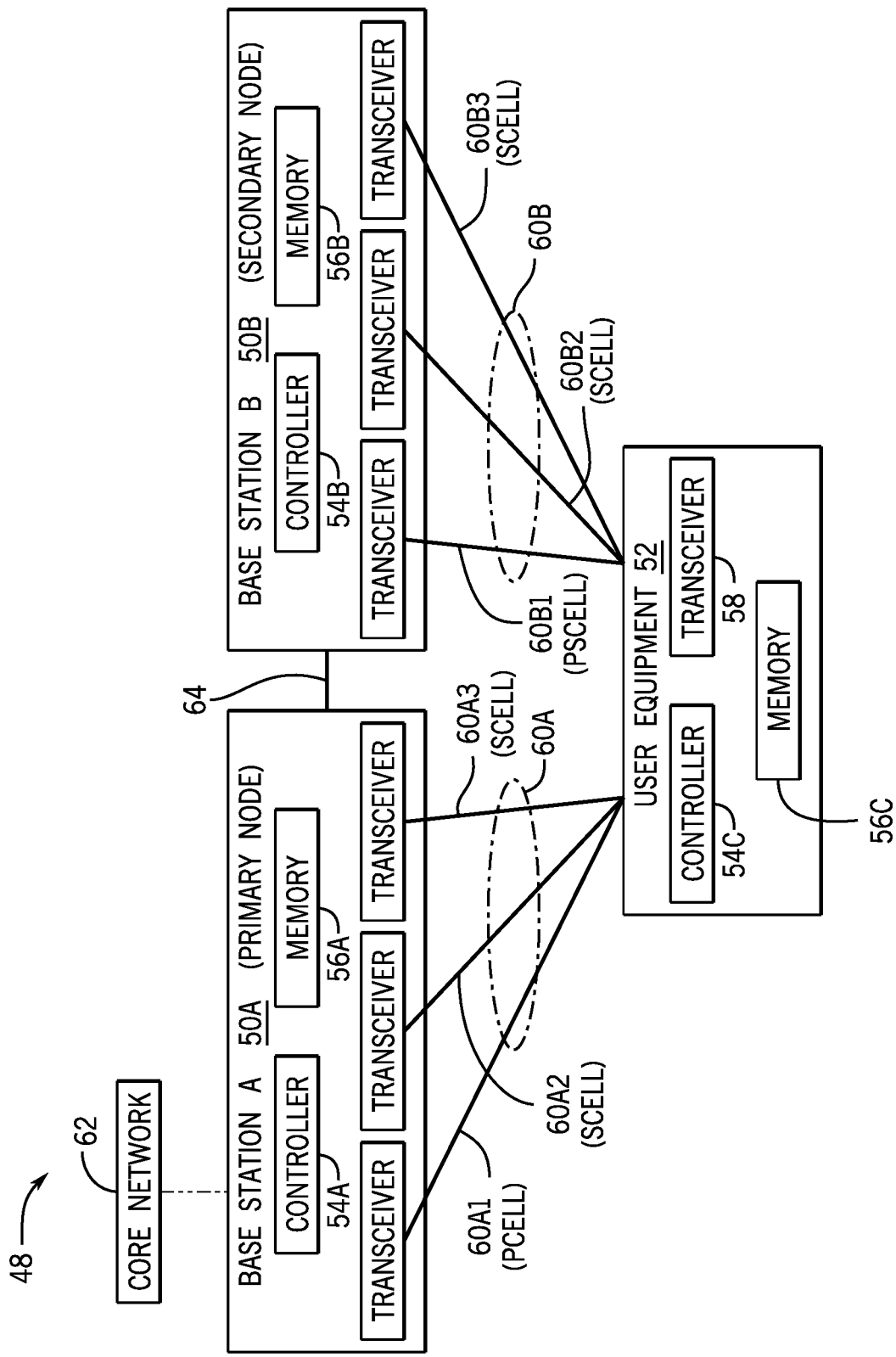
FIG. 7 is an illustration of base stations communicating with an electronic device, such as the electronic device of FIG. 1, in accordance with an embodiment of the present disclosure.

Keeping the foregoing in mind, FIG. 7 is an illustration of a cellular network 48 (e.g., a portion of a network is illustrated) that includes access network nodes, such as base stations 50 (e.g., base station 50A, base station 50B), and user equipment 52, such as the electronic device 10, according to embodiments of the present disclosure. Each of the base stations 50 and/or the user equipment 52 may have one or more components similar to the electronic device 10, and thus may include control circuitry as controller 54 (e.g., controller 54A, controller 54B, controller 54C), such as the processors 12, memory circuitry as memory 56 (memory 56A, memory 56B, memory 56C), such as the memory 14 and/or nonvolatile storage 16, which may operate together to cause the base stations 50 and/or the user equipment 52 to perform respective operations. It is noted that the user equipment 52 may include any of various types of computer systems or computing device which may communicate with the base stations 50. Examples of user equipment any suitable portable electronic devices, mobile telephones, smart phones, portable gaming devices, laptops, wearable devices, or the like.

In general, the term "UE" or "UE device" may be broadly defined to encompass any electronic, computing, and/or telecommunications device (or combination of devices) which may be easily transported by a user and capable of wireless communication. The term "base station" has the full breadth of its ordinary meaning, and at least includes a wireless communication station installed at a location (e.g., a fixed location) and used to communicate as part of a wireless telephone system or radio system. Generally, "uplink operations" refer to communications where one or more of the base stations 50 receive signals from the user equipment 52 and "downlink operations" refer to communications where the user equipment 52 receives signals from one or more of the base stations 50.

The base stations 50 and the electronic device 10 may communicate using any of various radio access technologies (RATs), also referred to as wireless communication technologies, or telecommunication standards, such as Global System for Mobile Communications (GSM), Universal Mobile Telecommunications Service (UMTS) (e.g., associated with wide-band Code-Division Multiple Access (WCDMA) or time division (TD) short-band Code-Division Multiple Access (SCDMA) air interfaces), Long-Term Evolution (LTE), LTE-Advanced (LTE-A), 5G New Radio (5G NR), High Speed Packet Access (HSPA), 3GPP2 CDMA2000 (e.g., real-time text (1×RTT), Evolution-Data Optimized (1×EV-DO), High Rate Packet Data (HRPD), evolved HRPD (eHRPD)), or the like. Note that if a base station 50 provides LTE communication capability, it may alternately be referred to as an Evolved Universal Mobile Telecommunications System (UMTS) Terrestrial Radio Access Network (E-UTRAN) Node B, "eNodeB", or "eNB". Note that if a respective base station of the base stations is implemented in the context of 5G NR, it may alternately be referred to as "gNodeB" or "gNB".

Frequency ranges that enable communication between the base stations 50 and the electronic device 10 may be defined by a standards body (e.g., standards generated by the Third Generation Partnership Project (3GPP) standards body or development group), and thus may include a $3^{rd}$ generation (3G), $4^{th}$ generation (4G), $5^{th}$ generation (5G) frequency band. For example, the frequency band may include frequencies between 24 Gigahertz (GHz) and 48 GHz associated with 5G/NR networks. The user equipment 52 may include a transceiver 58 to communicate with the base stations 50 using an assigned group of frequencies referred to as a component carrier 60. The transceiver 58 may include transmitting circuitry to process and generate signals to transmit a data packet and may include receiving circuitry to receive and process received signals received as a data packet. Messages communicated using frequencies within a same frequency band on separate component carriers 60 may be transmitted (e.g., concurrently) generally without cross-interference since the different component carriers 60 are associated with non-overlapping and/or different frequency ranges. It is noted that component carriers 60 are sometimes characterized by a center frequency and a bandwidth that defines which portion of a frequency range is allocated to communications sent using the component carrier 60. The base stations 50 and/or the user equipment 52 may use component carriers 60 to communicate data packets modulated on radio frequency waves characterized by frequencies within the bandwidth assigned to the component carrier 60. Component carriers 60 may be considered wireless links between the base stations 50 and the user equipment 52, and may be used to coordinate communications such that communications may remain non-overlapping when intended as such.

In some instances, the user equipment 52 may wirelessly couple to (e.g., communicate with) one or more base stations 50 through two or more component carriers 60. For example, the user equipment 52 may use a set of component carriers 60A to communicate with the base station 50A and use another set of component carriers 60B to communicate with the base station 50B. In some embodiments, the sets of component carriers 60A, 60B may both be within a same frequency band, such as a New Radio (NR) or $5^{th}$ generation (5G) frequency band, but may be associated with different frequency ranges within the same frequency band. For example, component carrier 60A1 may use a first frequency range (e.g., sub-band) within a first frequency band and component carrier 60A2 may use a second frequency range (e.g., a different frequency range or sub-band) within the first frequency band. In some cases, however, the component carriers 60A, 60B, and the respective base stations 50 deploy different communication networks (e.g., NR or LTE) or a combination of communication networks (e.g., NR and LTE).

For example, the base station 50A may enlist the base station 50B when the base station 50 are respectively associated with different radio network technologies (e.g., as provided by a multi-radio access technology (multi-RAT) network 48). When the network 48 is deployed as a multi-RAT dual connectivity (MR-DC) network, the network 48 may use two or more radio access technologies (RAT) at different times to communicate with the user equipment 52. Another example of an MR-DC network includes a network that uses both an air interface of LTE network (referred to as an "E-UTRA" network) and an E-UTRAN NR Dual Connectivity (EN-DC) network.

Certain adjustments may be performed to improve or optimize network operation. For example, for an MR-DC or EN-DC network, the base stations 50 may switch between network types to communicate with the user equipment 52. Other adjustments include the user equipment 52 performing (e.g., at portions of the transceiver 58) non-simultaneous uplink switching (NSU) operations and/or selective carrier aggregation (CA) between component carriers 60. Dynamically adjusting a bandwidth or an amount of resources allocated to the user equipment 52 using one or more component carriers 60 may improve flexibility of the network 48 by not restricting a core network 62 of the network provider from keeping a bandwidth allocated to the user equipment 52 constant. In particular, some user equipment 52 may, at certain times, be using less than their allocated bandwidth, while other user equipment 52 may benefit from more than their allocated bandwidth. Dynamically allocating bandwidth by reallocating component carriers 60 between the user equipment 52 may more efficiently distribute bandwidth to meet or address the demands of the network 48, which may result in an overall reduction of resources used to deploy the network 48.

The base stations 50 may use non-simultaneous uplink (NSU) operations when communicating with the user equipment 52 as opposed to scheduling the user equipment 52 to transmit on multiple component carriers 60 at the same time. Non-simultaneous uplink may mean that given a configuration with a certain set of uplink component carriers, uplink operations by the user equipment 52 are performed on a subset of the configured uplink component carriers, while downlink operations on all of the configured component carriers are performed. For example, in releases 16 and 17 of 3GPP communication standards, NSU operations are proposed as a way to achieve improved frequency band budgeting with reduced device complexities and improved scheduling flexibility. User equipment 52 may be operated according to a schedule, or pattern, of communication allocations (e.g., included in a communication configuration) that define when uplink of data is to occur over which subset of configured component carriers and when to perform a switching operation to another subset of component carriers. The user equipment 52 may rely on duplex configuration of the frequency band in which it is operating to reference the schedule of communication allocations to determine when to configure its circuitry to transmit signals and when to configure its circuitry to receive signals. For example, the user equipment 52 may reference the schedule of communication allocations to know when to switch its circuitry to perform uplink operations using a first component carrier 60 and when to switch its circuitry to perform downlink operations using the first component carrier 60. Operating according to the schedule of communication allocations may enable the user equipment 52 to know when, on a particular component carrier (e.g., component carrier 60A1) of component carriers 60 (e.g., component carrier 60A2, component carrier 60A3, component carrier 60B1, component carrier 60B2, component carrier 60B3), uplink or downlink is permitted, and thus when to expect to receive signals or transmit signals.

The core network 62 may instruct a base station 50 assigned as a primary node of the network 48 to operate according to dynamic bandwidth assignments, NSU operations, or the like. It is noted that the base station 50A, assigned as the primary node, may receive data to communicate with the user equipment 52 and/or configuration data from the core network 62, while the base station 50B, assigned as a secondary node, may receive data to communicate with the user equipment 52 and/or configuration data from the base station 50A via inter-base station communicative coupling 64. Indeed, the primary node communicates with the core network 62 on behalf of secondary nodes in the network. In some cases, one or more base stations 50 may perform local (e.g., in-base station 50) analysis of bandwidth allocations, link quality, latencies, or the like (and/or transmit the data to the core network 62 for analysis), to determine whether a switching operation is to be performed. In this way, switching instructions may originate from any of the base stations 50 and/or the core network 62 to improve network operations.

To implement a particular switching operation, in some embodiments, the component carriers 60 may switch between being assigned as a primary cell (Pcell), a primary-secondary cell (PScell), or a secondary cell (Scell). It is noted that a component carrier 60 assigned as a primary cell of the base station 50 that is assigned as a primary node may be referred to as a primary cell (Pcell), while a component carrier 60 assigned as a primary cell of the base station 50 that is assigned as a secondary node may be referred to as a primary-secondary cell (PScell). As referenced hereafter, "Pcell" refers to the primary cell (Pcell) of the primary node. It is noted that Pcells and PScells may be used when transmitting statuses and/or other prioritized communications between the base stations 50 and the user equipment 52. Pcells and/or PScells may support physical uplink control channel (PUCCH) transmissions of radio resource control (RRC) signaling messages, physical random access channel (PRACH) transmission of messages, or the like. For example, Pcells and/or PScells may operate on a primary frequency or frequency range, in which the user equipment 52 may perform an initial connection establishment procedure, initiate a connection re-establishment procedure, and/or a handover procedure. Scells may operate on a secondary frequency or frequency range, which may be configured once a radio resource control (RRC) connection is established and which may be used to provide additional radio resources.

In some cases, the component carrier 60 assigned as the PScell may operate as a Pcell, such as when dual connectivity operations (e.g., EN-DC, CA/EN-DC) are not used. The base station 50 assigned as the primary node and the base station 50 assigned as the secondary node may respectively use the component carriers 60 assigned as secondary cells (Scells) to communicate with the user equipment 52, such as when additional bandwidth is to be used to communicate with the user equipment 52. For example, the base station 50A may be a primary node having a Pcell assigned as the component carrier 60A1 and having Scells assigned to component carrier 60A2 and component carrier 60A3. The base station 50B is shown as the secondary node having a PScell assigned as the component carrier 60B1 and having Scells assigned as the component carrier 60B2 and component carrier 60B3. The PScell of the base station 50B (e.g., component carrier 60B1) may operate as a Scell to the component carrier 60A1 (e.g., Pcell) and may also operate as a Pcell to the component carriers 60B2, 60B3 (e.g., Scells of a secondary node).

Pcell, PScell, and/or Scell assignment may switch in response to a change of operation initiated by the base stations 50 and/or the core network 62, a change in a quality of communication links between the base stations 50 and the user equipment 52 changes (e.g., a communication link worsens or improves beyond a threshold amount of noise, amplitude, frequency or the like, that triggers a change in a primary serving cell for the user equipment 52), or the like. Pcell, PScell, and Scell switching operations may occur without also switching primary node (Pnode) and/or secondary node (Snode) assignments. A Pcell switch may be performed without performing a Scell switch, a Scell switch may be performed without performing a Pcell or PScell switch, or any combination thereof.

Pcell switching may be complicated by ongoing Scell switching operations between component carriers 60, such as switching associated with non-simultaneous uplink operations. The systems and methods described herein may enable the network 48 to perform Pcell and PScell switching in dual-connected networks compatible with non-simultaneous uplink operations, among other operations.

Keeping the foregoing in mind, FIG. 8A-8D are illustrations of example switching operations associated with component carriers 60 of different frequency ranges (e.g., represented by frequency allocations distributed across frequency axis 74). Indeed, these switching operations may be considered as bandwidth parts (BWP) switching operations since, for example, the respective portions of a bandwidth allocated to a respective base station 50 (e.g., the component carriers 60) may be switched or reassigned roles in communication operations of the network 48.

Figure 8A:
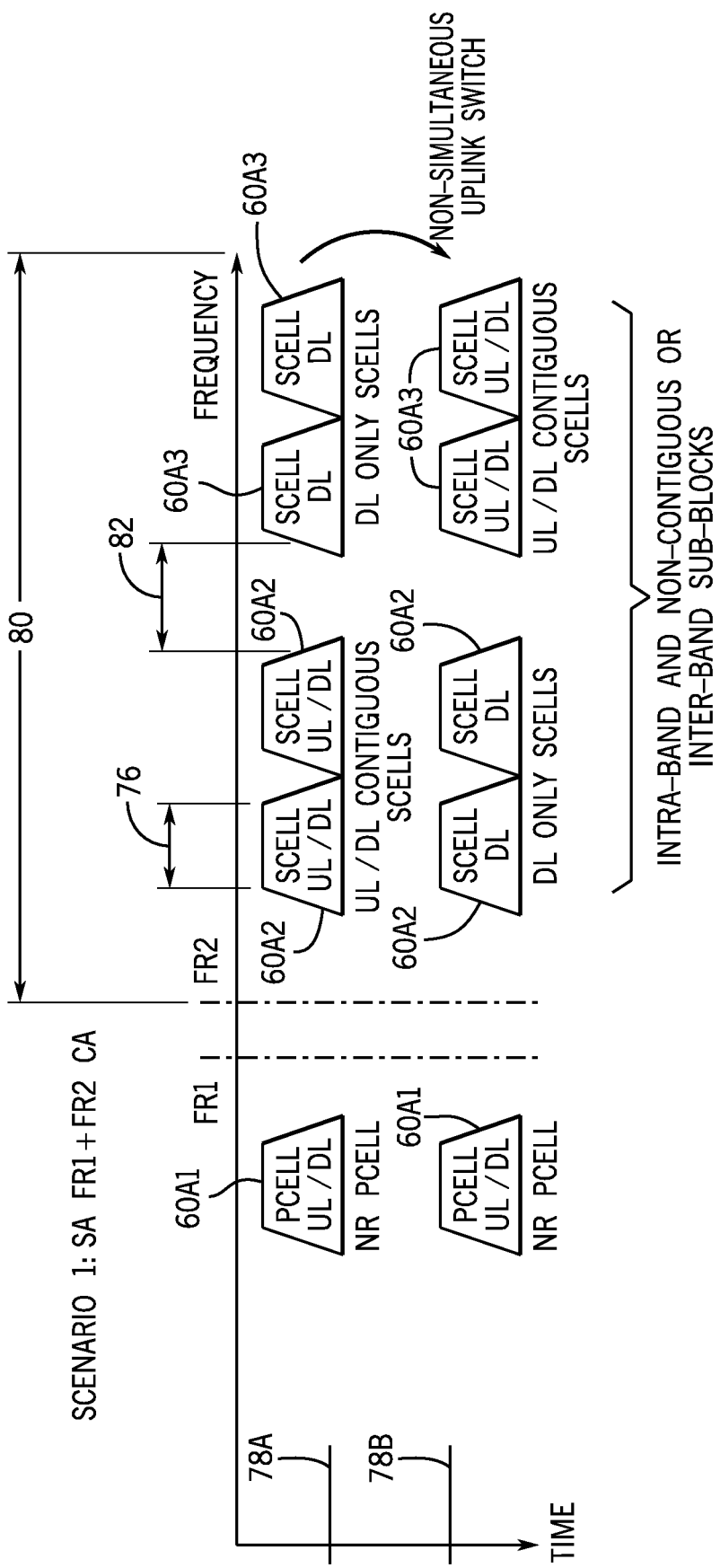
FIG. 8A is an illustration of a first example of switching secondary cell assignments of component carriers in a standalone network, in accordance with an embodiment of the present disclosure.

In particular, FIG. 8A shows a Scell switching operation between FR2 designated component carriers in a standalone (SA) network (e.g., a network that uses one type of network, such as NR). Indeed, the component carriers 60 visualized in the FR2 frequency band 80 illustrate a Scell switching operation between component carriers 60 to enable non-simultaneous uplink operations (e.g., switching component carriers 60 between a Scell DL assignment for downlink-only communications on that communication carrier 60 and a Scell UL/DL assignment to enable downlink and uplink communications on that component carrier 60). The Scell switching operation shown in FIG. 8A may be generally combined with Pcell switching or PScell switching operations (e.g., shown in FIG. 8C or FIG. 8D) to manage both a change in Pcell assignment as well as non-simultaneous uplink operations, such that communications are not dropped during either of the switching operations.

Taking base station 50A from FIG. 7 as the example, each of the component carriers 60A are visualized in FIG. 8A as corresponding to a frequency range 76 (e.g., bounded between two frequencies over time (e.g., from a first time 78A to a second time 78B). Each frequency range 76 is maintained over a switching operation that reassigns the component carrier 60A2 from a secondary cell used for both uplink and downlink communications (e.g., Scell UL/DL) to a secondary cell used for downlink operations (Scell DL) and not uplink operations, and reassigns the component carrier 60A3 from an Scell DL to an Scell UL/DL. The component carriers 60A2, 60A3 may be assigned frequencies that are intra-band non-contiguous and/or inter-band frequency allocations. That is, component carriers 60 that use contiguous frequencies in a same frequency band may be referred to as "intra-band contiguous" while component carriers 60 that use frequencies in a same frequency band but separated by a gap in frequencies may be referred to as "intra-band non-contiguous." Component carriers 60 that use frequencies in different frequency bands separated by a gap in frequencies may be referred to as "inter-band." In FIG. 8A, for example, the components carriers 60A assigned to the different cell functions in the FR2 frequency band 80 may be either considered intra-band non-contiguous (i.e., in the same frequency band) or inter-band sub-blocks (i.e., in different frequency bands) since a frequency range 82 (e.g., frequency gap) separates the frequency allocations of the different component carriers 60A2, 60A3.

As shown in FIG. 8A, Scell switches associated with a non-simultaneous uplink (NSU) operation is performed. In particular, the component carriers 60A2 assigned at a first time 78A as Scell UL/DL are switched and assigned as Scell DL by a second time 78B. Additionally, the component carriers 60A3 assigned at a first time 78A as Scell DL are switched and assigned as Scell UL/DL by the second time 78B. During switching, the component carrier 60A1 assigned as a Pcell is left unchanged from the first time 78A to the second time 78B.

Figure 8B:
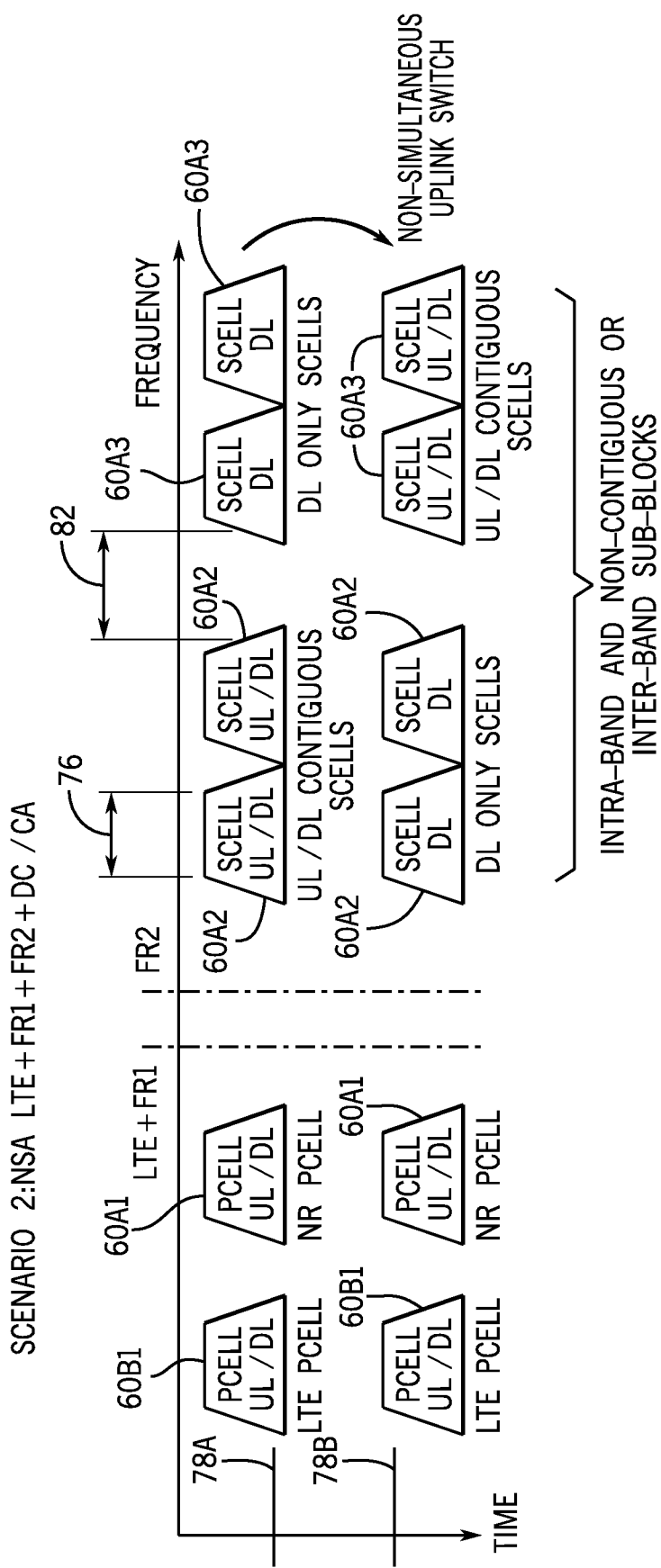
FIG. 8B is an illustration of a second example of switching secondary cell assignments of component carriers in a non-standalone network, in accordance with an embodiment of the present disclosure.

Similar switching operations are illustrated in FIG. 8B. FIG. 8B is an illustration of a second example switching operation. In particular, FIG. 8B shows a Scell switching operation between FR2 component carriers 60 in a network that uses two or more types of communication protocol (e.g., NR and LTE), also referred to as a non-standalone (NSA) network. The base station 50B of FIG. 7 may operate using LTE communication protocols and be assigned as the primary node while the base station 50A may operate using NR communication protocols and be assigned as the secondary node. Following these assignments, the base station 50B may assign the component carrier 60B1 as a Pcell UL/DL and the base station 50A may assign the component carrier 60A1 as a PScell UL/DL. The Pcell and PScell assignments may remain constant from the first time 78A to the second time 78B. However, the base station 50A may switch Scell assignments based on the communication schedule. Thus, between the first time 78A and the second time 78B, the base station 50A may switch assignments such that the component carriers 60A2 are assigned from Scells UL/DL to Scells DL, and the component carriers 60A3 is assigned from SCells DL to Scells UL/DL. It is noted that any combination of component carrier 60 switching may occur, even if not particularly called out herein, and thus any of the component carriers 60 may be assigned any suitable role.

Figure 8C:
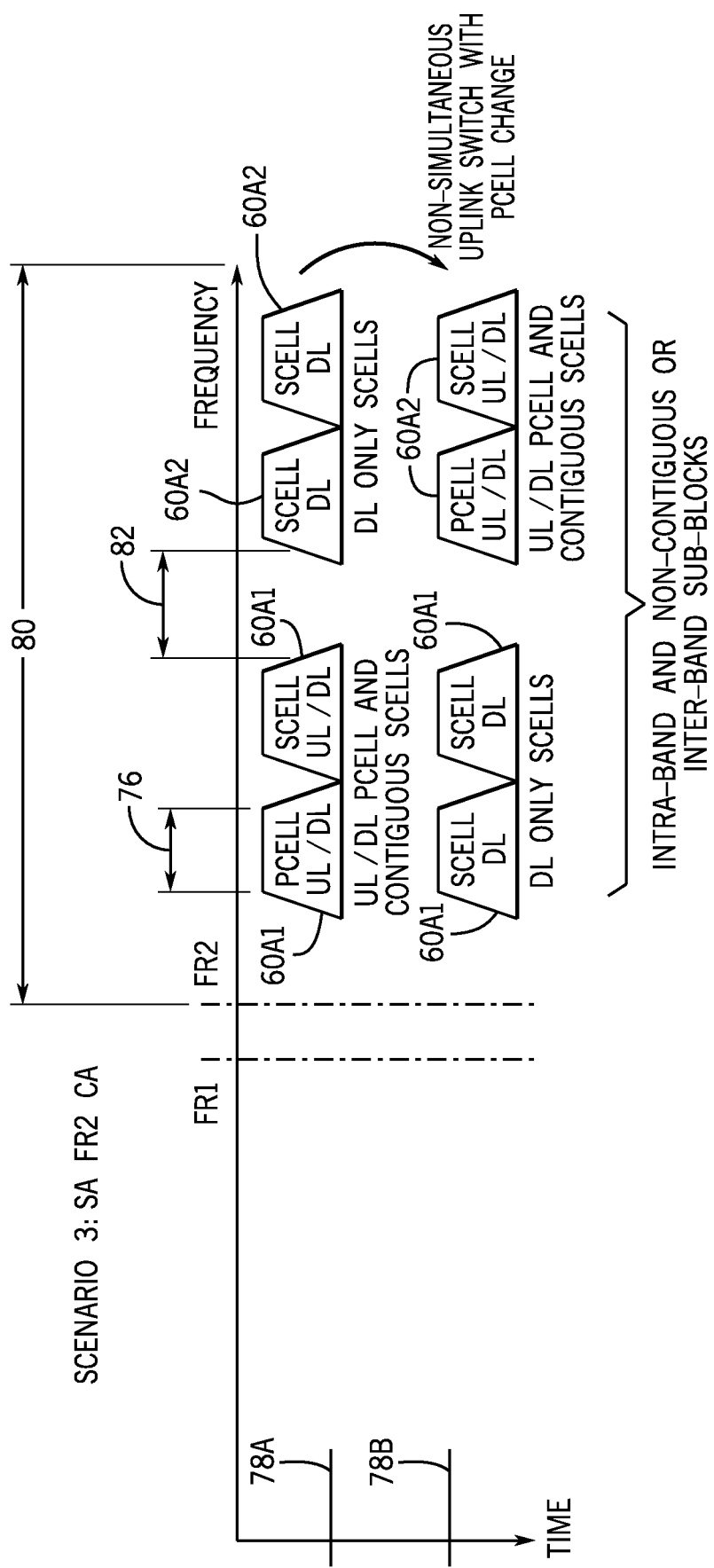
FIG. 8C is an illustration of a third example of switching primary cell assignments of component carriers, in accordance with an embodiment of the present disclosure.
Figure 8D:
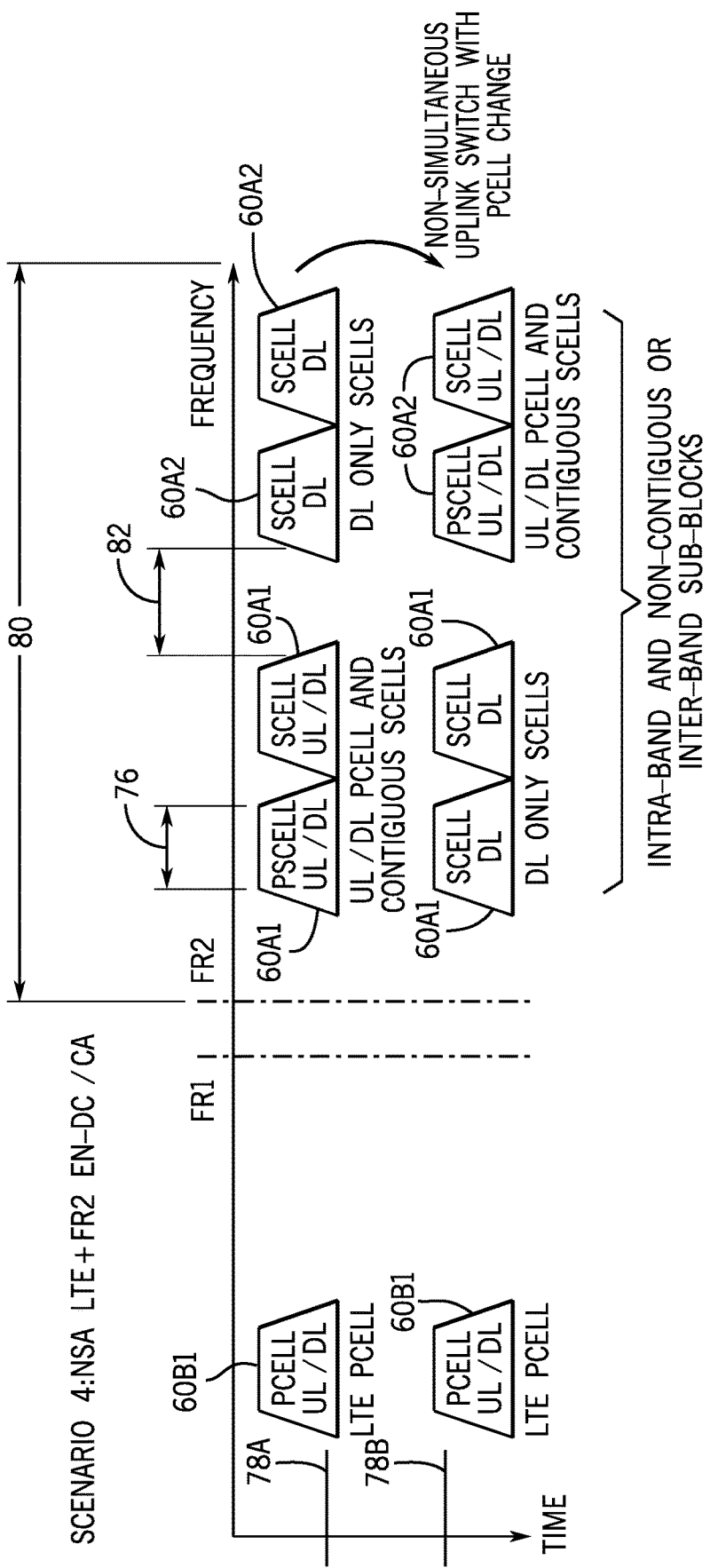
FIG. 8D is an illustration of a fourth example of switching of primary secondary cell assignments of component carriers, in accordance with an embodiment of the present disclosure.

Sometimes the base stations 50 coordinate a Pcell switch in the FR2 frequency band 80 depicted by FIGS. 8C and 8D. In particular, FIG. 8C is an illustration of a third example switching operation for Pcell switching in FR2 frequency band 80. The switching operation of FIG. 8C may correspond to an SA network where the base station 50A is assigned as the primary node. Following these assignments, the base station 50A may assign, at the first time 78A, the component carriers 60A1 as a Pcell UL/DL and an Scell UL/DL, and other component carriers 60, such as the component carriers 60A2, as Scells DL. The base station 50A may determine to switch the component carrier 60 assigned as the Pcell. Thus, by the second time 78B, the switching operation may occur, the base station 50A may reassign the component carriers 60A2 initially assigned as Scells DL to a Pcell UL/DL and an Scell UL/DL. Additionally, the base station 50A may reassign the component carrier 60A1 initially assigned as a Pcell UL/DL and an Scell UL/DL as Scells DL.

Furthermore, FIG. 8D is an illustration of a fourth example switching operation for PScell switching in FR2 frequency band 80. As illustrated, the switching operation is performed in an NSA network where the base station 50B, using LTE communication protocols, is assigned as the primary node, and the base station 50A, using NR communication protocols, is assigned as the secondary node. Following these assignments, the base station 50B may assign, for use at the first time 78A, the component carriers 60B1 as the Pcell UL/DL. The base station 50A may assign the component carriers 60A1 as a PScell UL/DL and an Scell UL/DL, and assign the component carriers 60A2 as Scells DL. During operation of the network 48, the base station 50A may determine to switch the component carrier 60 assigned as the PScell. Thus, by the second time 78B, the switching operation may occur, and the base station 50A may have reassigned the component carriers 60A1 as Scells DL, as well as reassigning the component carriers 60A2 to a Pcell UL/DL and an Scell UL/DL.

These or any other switching operations may be initiated by one or more base stations 50. The primary base station 50 may reassign, or switch assignments of, component carriers 60 of base stations 50 (e.g., its own component carriers 60 as the primary base station, or component carriers 60 of secondary base stations) to help improve bandwidth allocations and/or link characteristics used to communicate with the user equipment 52. For example, when the base station 50A is assigned as the primary station in FIG. 8A-8C, the base station 50A may determine when to switch assignments of the component carriers 60A (e.g., its own component carriers 60A). In some cases, the switching is request by the user equipment 52. However, in other cases, the switching is confirmed or requested by the base station 50A itself, such as in response to a determination that noise is relatively high on a respective component carrier 60A, or that a communication operation may be better suited on a different combination of component carriers 60.

A variety of processes may be used to signal the switching between the user equipment 52 and the primary base station 50, which, for convenience, is referred to as base station 50 with the understanding that, when performing the switching operations of FIGS. 8A-8C, refers to base station 50A, and when performing the switching operations of FIG. 8D, refers to base station 50B. For example, the base station 50 may perform a make-before-break handover (MBB) switching operation, a switching operation performed without random-access channel notification (RACH)-based communications, and/or a switching operation that uses parameters, such as parameters stored in a memory or that are predefined prior to operation of the network 48.

Figure 9:
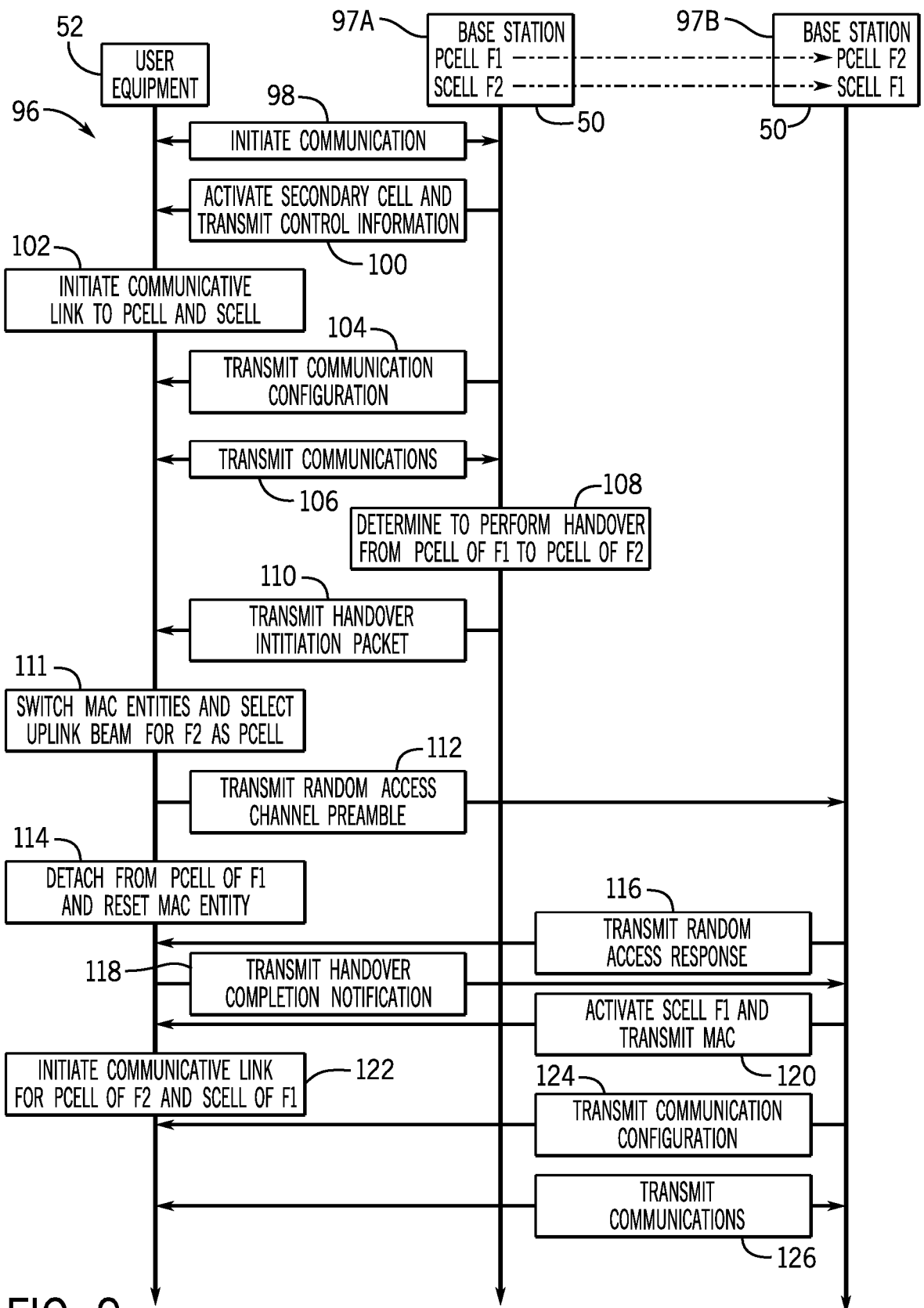
FIG. 9 is a flow chart of a method for performing a primary cell (or primary secondary cell) switch between component carriers using a make-before break (MBB) process, in accordance with an embodiment of the present disclosure.
Figure 10:
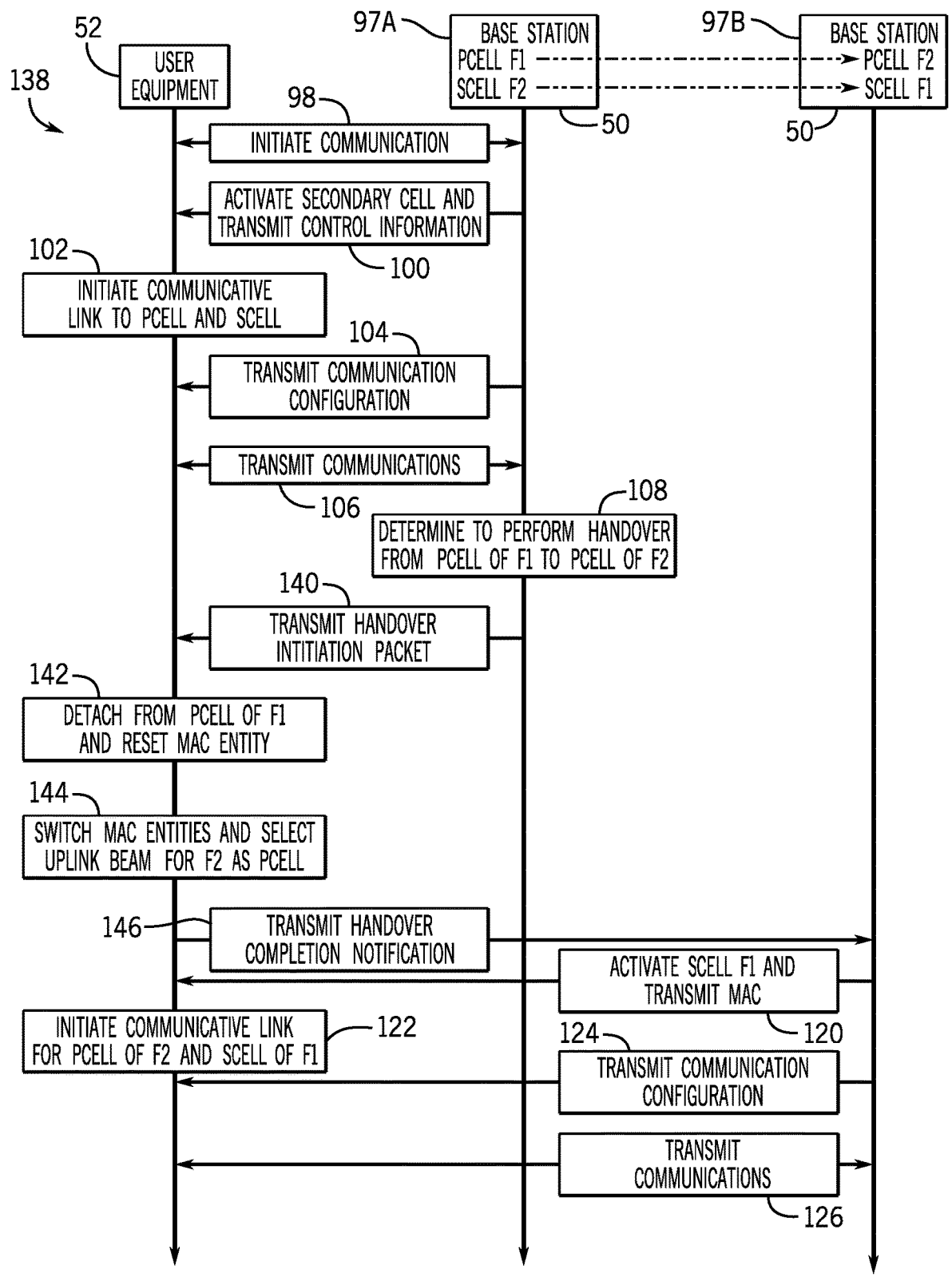
FIG. 10 is a flow chart of a method for performing a primary cell (or primary secondary cell) switch between component carriers using random-access channel-less (RACH-less) signaling processes, in accordance with an embodiment of the present disclosure.
Figure 11:
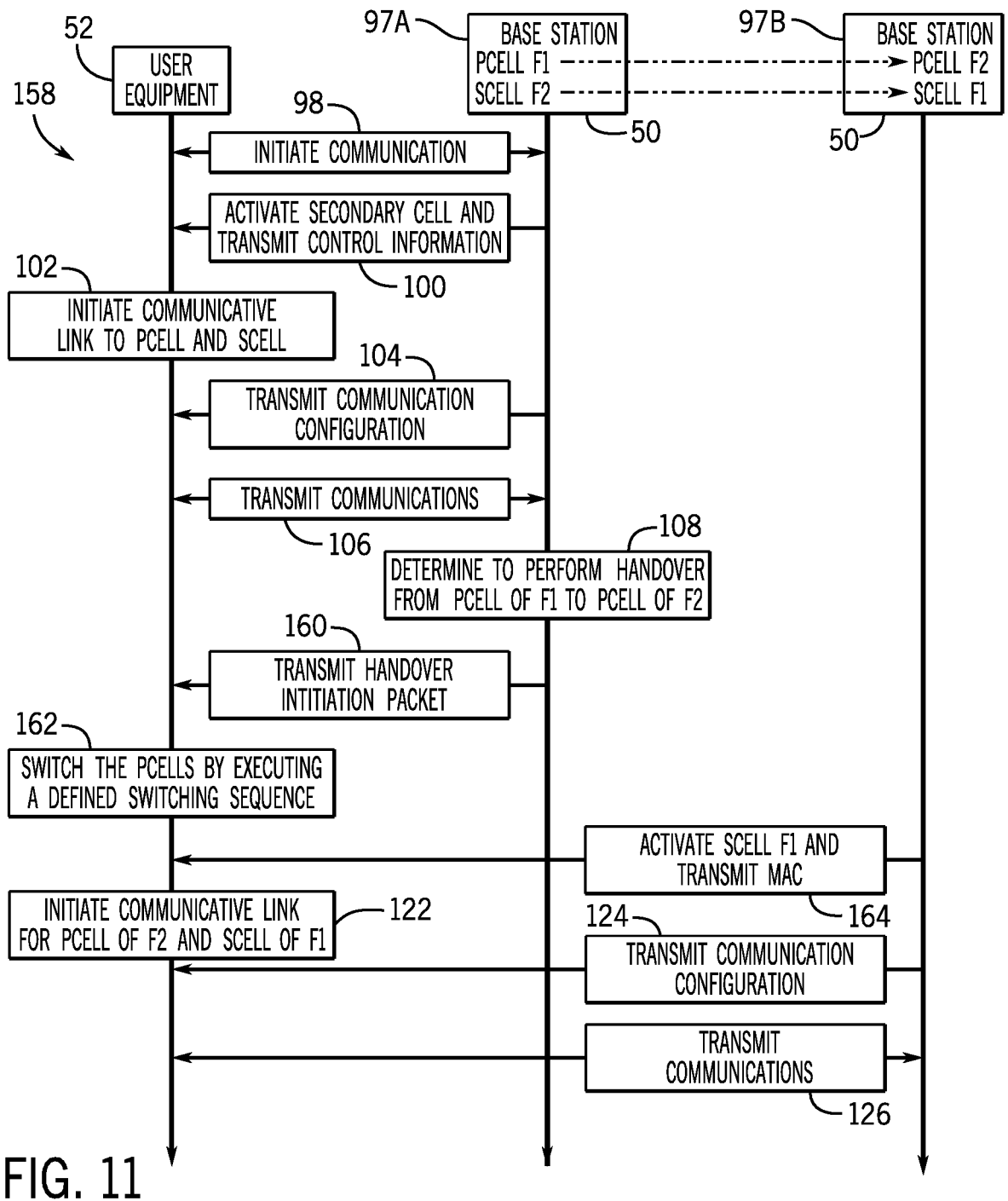
FIG. 11 is a flow chart of a method for performing a primary cell (or primary secondary cell) switch between component carriers using a defined sequence of operations when triggered by a handover initiation packet, in accordance with an embodiment of the present disclosure.

FIGS. 9-11 show operations performed by the user equipment 52 and base stations 50 when performing MBB switching operations, switching operations performed without RACH-based communications, and/or switching operations that use switching parameters, such as parameters stored in a memory or that are predefined prior to operation of the network 48. In each of these examples, switching may occur between component carriers 60 of a single base station 50 or of two synchronized base stations 50 (such as the base station 50A and the base station 50B when operating to deploy a same type of communication network (e.g., both NR, both LTE)). For ease of discussion, the following processes and systems are described with reference to Pcell switching operations performed between component carriers 60 of a same base station, such as between component carriers 60A1 and 60A2 as illustrated in FIG. 8C and FIG. 8D. However, it should be understood that these methods may be applied to any suitable switching operation, including switching operations performed between NR networks, LTE networks, or networks that use both NR communication protocols and LTE communication protocols (e.g., such as those discussed with regard to FIGS. 8B and 8D).

To further improve switching operations, certain communication configurations used with an original Pcell assignment may be transferred or switched to a new Pcell cell. That is, a communication configuration may be a stored indication of properties such as center frequencies, communication power levels, uplink/downlink (UL/DL) allocation periods or frequencies, beam management information related to the optimal configuration of the base station receive and transmit antennas to maximize the reception of the UE's uplink signal (e.g. spatial filter information, beam identifier (ID), angle of arrival or departure, beamforming coefficients, etc.), or the like, to be used when communicating between a user equipment 52 and a particular component carrier 60 and/or one or more base stations 50. Thus, when primary cell switching between synchronized base stations 50 (e.g., when switching primary cells from a component carrier 60 of a first base station 50 to a component carrier 60 of a second base station 50) is performed, the first base station 50 may share one or more corresponding communication configurations with the second base station 50. Indeed, when reassigning the Pcell of a base station 50 from a first component carrier 60 to a second component carrier 60, the base station 50 may use similar or same communication configurations when operating the second component carrier 60 that were used when operating the first component carrier 60. Sharing these configurations may reduce an amount of time used for completion of the switching since some initialization operations are not repeated after switching and/or to complete the switching. For example, initialization operations related to center frequencies, communication power levels, and/or UL/DL allocation periods may be shared so that the base station 50 may avoid redetermining this information to operate the newly assigned Pcell.

To elaborate on MBB switching operations, FIG. 9 is a flow diagram of operations performed by the user equipment 52 and the base station 50 when performing a MBB switching operational flow. The MBB switching operations enable communication links between the base station 50 and the user equipment 52 to be maintained (e.g., avoiding dropping the communication links and thus the need to re-establish the communication links). After the new communication links are established, the existing (previously used) communication links may be dropped, and the Pcell switch may be considered complete.

Indeed, FIG. 9 is a flow diagram of a method 96 for operating the base station 50 and the user equipment 52 to coordinate a Pcell switch between component carriers 60, according to embodiments of the present disclosure. It is noted that, although depicted in a particular order, the blocks of the method 96 may be performed in any suitable order, and at least some blocks may be skipped altogether. As described herein, the method 96 is described as performed in part by the user equipment 52 and in part by the base station 50, first using a first component carrier 60 as the Pcell before the Pcell switch, and then using a second component carrier 60 as the Pcell after the Pcell switch. For each of the following method examples (e.g., FIGS. 9-11), the user equipment 52 uses the first component carrier 60 as the Pcell when communicating with the base station 50 in configuration 97A until the Pcell switch occurs, and then the user equipment 52 uses the second component carrier 60 as the Pcell when communicating with the base station 50 in configuration 97B. However, it should be understood that any suitable processing and/or control circuitry may perform some or all of the operations of the method 96, such as one or more of the processors 12, the core network 62, or the like.

At block 98, the base station 50 initiates communication with the user equipment 52 using a first component carrier 60 assigned as a Pcell. The base station 50 may transmit and/or receive information used to initiate communication with the user equipment 52 using the first component carrier 60. The information may include initial access requests, radio resource control (RRC) configurations, cell group configurations, or the like, used by the user equipment 52 to establish the first component carrier 60 as the Pcell and the second component carrier 60 as the Scell. Once configured, the user equipment 52 uses the first component carrier 60 as the Pcell when communicating with the base station 50 in configuration 97A until the Pcell switch occurs, and then the user equipment 52 uses the second component carrier 60 as the Pcell when communicating with the base station 50 in configuration 97B.

At block 100, the base station 50 activates an Scell and transmits control information to the user equipment 52. That is, the base station 50 may assign a second component carrier 60 as the Scell and communicate this assignment to the user equipment 52. To communicate the assignment to the user equipment 52, the base station 50 may transmit control information to the user equipment 52, which the user equipment 52 may use to assign the second component carrier 60 to the Scell. In some embodiments, the control information may include a medium access control (MAC) control element (CE).

Using the information received from the base station 50, the user equipment 52, at block 102, initiates communicative links to first component carrier 60 assigned as the Pcell and to the second component carrier 60 assigned as the Scell of the base station 50. The user equipment 52 may identify and/or calibrate one or more circuits of the transceiver 58 to the frequencies assigned to each of the first component carrier 60 and the second component carrier 60. In particular, calibrating the transceiver 58 to the frequencies may permit the user equipment 52 to transmit and/or receive messages using the frequencies via the respective component carriers 60.

At block 104, the base station 50 transmits a communication configuration to the user equipment 52. As described above, the communication configuration may indicate a communication schedule for the user equipment 52 to follow when operating. The user equipment 52 may anticipate a Scell switch based on uplink allocations and/or downlink allocations that are indicated by the communication schedule. Using the communication allocations indicated by the communication schedule of the communication configuration, the user equipment 52 communicates with the base station 50 at block 106 (e.g., transmit and/or receive data). Communications exchanged between the base station 50 and the user equipment 52 may include user data and/or measurement control information and reports referenced by the base station 50 to determine when to perform Pcell switching. For example, the base station 50 may transmit the measurement control information to the user equipment 52 to request that the user equipment 52 perform a particular sensing operation. Reports may include information resulting from the sensing operation (e.g., measurements, sensed data) that may be used by the base station 50 to determine link quality. For example, the reports may include and/or indicate sensed noise levels associated with the respective component carriers 60, amplitudes (e.g., average amplitudes) of received communications used to determine attenuation of signals, or the like.

At block 108, the base station 50 determines to perform a Pcell switch from the first component carrier 60 to the second component carrier 60. In particular, the base station 50 may reassign the first component carrier 60 as a Scell. The Pcell switch described may be represented as a Pcell F1 to Pcell F2 switch since the frequencies used as the Pcell change as a result from the Pcell switch from a first frequency range (F1) to a second frequency range (F2) (which should not be confused with the designation for the FR2 defined frequency band associated with 5G/NR operations). In particular, the first component carrier 60 may include the first frequency range (F1), while the second component carrier 60 may include the second frequency range (F2).

At block 110, the base station 50 transmits a handover initiation packet to the user equipment 52 to start the Pcell switch. The handover initiation packet may include an identifier to communicate to the user equipment 52 to perform a make-before-break (MBB) Pcell switch, where a connection to the new Pcell (e.g., the second component carrier 60) is made before detaching from the current Pcell (e.g., the first component carrier 60). Other information included in the handover initiation packet may include radio resource control (RRC) setup information, cell group configurations, an indicator to use RACH-less handover methods, an indicator to use predefined switching operations, or the like. In this case, the information may at least include an indication to use MBB handover methods with the user equipment 52. In response to receiving the handover initiation packet, the user equipment 52 may prepare to perform the Pcell switch in its systems (e.g., hardware, software). As part of these operations, the base station 50 may pause outgoing communications unrelated to the switching operations to the user equipment 52 as to not drop any messages.

The base station 50 may use a variety of suitable signaling techniques to transmit the handover initiation packet (e.g., block 110) and/or to transmit or receive any packet or communication described herein, including physical (PHY) layer signals, medium access control (MAC) layer signals (e.g., MAC CE), radio resource control (RRC) signaling, as part of downlink control information (DCI) transmitted as a DCI command, or the like. In this way, the base station 50 may transmit the handover initiation packet as an RRC protocol message, in response to a MAC protocol message, a message transmitted via a physical layer signaling, or the like. Furthermore, in some cases, the base station 50 may transmit the handover initiation packet in response to receiving a control signal from the controller 54 of the base station 50 or another base station 50 (e.g., controller 54A, controller 54B), according to timing parameters or on a timing schedule maintained by the controller 54 for managing Pcell switching operations and/or non-simultaneous uplink operations.

Indeed, in response to receiving the handover initiation packet, the user equipment 52, at block 111, switches MAC entities used for the second frequency range (e.g., the second component carrier 60) to communicatively link with the second component carrier 60 as the primary cell without unlinking from the first component carrier 60 as the primary cell. This may involve a network address change between an address used for the second component carrier 60 when assigned as a Scell and an address used for the second component carrier 60 when assigned as a Pcell and/or PScell. Similar to operations of block 102, the communicative link may involve initiation of a MAC layer and/or interface between the user equipment 52 and the base station 50 via the respective component carrier 60. As part of these operations, the user equipment 52 may also pause outgoing communications unrelated to the switching operations as to not drop any messages.

Once the user equipment 52 is linked with the second component carrier 60, at block 112, the user equipment 52 transmits a random access preamble to the base station 50 using the second component carrier 60 as the Pcell (represented by the transmission occurring to the "Pcell F2" configuration), as opposed to the first component carrier 60. This transmission may indicate to the base station 50 that the user equipment 52 is ready to receive communications using the second component carrier 60 as the Pcell. At block 114, the user equipment 52 detaches from the first component carrier 60 as the Pcell after attaching to the second component carrier 60 as the Pcell. This make-before-break (MBB) connection causes the user equipment 52 to keep its connection to a previous Pcell (e.g., the first component carrier 60) until after connecting to a next Pcell (e.g., the second component carrier 60). The first component carrier 60 may be reassigned as a Scell. Furthermore, radio resource management (RRM) configuration definitions (e.g., for Pcells, PScells, and/or Scells) may be adjusted for cases where a target frequency of a respective component carrier 60 is already configured (e.g., by the user equipment 52) as an Scell DL to prevent overlapping assignments. The switching operations of block 114 may be performed at least substantially simultaneous to (e.g., at least partially overlapping with) operations of block 112.

Thus, the configuration of the second component carrier 60 as the Pcell and the first component carrier 60 as the Scell may continue at the base station 50, the user equipment 52, or both. At block 116, after receiving the random access channel preamble from the user equipment 52, the base station 50 transmits a random access response as a confirmation message on the second component carrier 60 assigned as the Pcell to the user equipment 52.

At block 118, the user equipment 52 confirms receipt of the random access response from the base station 50 at least in part by transmitting a handover completion notification to the base station 50. Because the handover completion notification is transmitted after the user equipment 52 detaches from the first component carrier 60 as the Pcell, the handover completion notification may confirm completion of the Pcell switch to the base station 50. In response to receiving the handover completion notification, at block 120, the base station 50 activates the first component carrier 60 as the Scell and transmits control information (e.g., MAC CE) to the user equipment 52. These operations may be similar to operations of block 100, but may use the first component carrier 60 as the Scell as opposed to the second component carrier 60. Upon receiving the control information, at block 122, the user equipment 52 initiates a communicative link to the Pcell via the second component carrier 60 and to the Scell via the first component carrier 60. Similar to operations of block 102, the communicative link initiation may involve initiation of a MAC layer and/or interface between the user equipment 52 and the base station 50 via the respective component carrier 60.

At block 124, the base station 50 transmits a communication configuration to the user equipment 52. The communication configuration may define a communication schedule for the user equipment 52 to follow when communicating using the Pcell and Scell. In some cases, this block may be skipped in lieu of the user equipment 52 and the base station 50 each referencing communication schedules for the Pcell and Scell stored prior to the Pcell switching occurring. For example, the base station 50 and the user equipment 52 may store the communication schedule received via operations of block 104 in memory and reference the stored communication schedules after the Pcell switch to determine which Pcell and Scell communication allocations to comply with, as opposed to communicating via a new communication schedule or repeating a transmission of an existing communication schedule at block 124. The communication schedule may account for Scell switching operations in non-simultaneous uplink operations between component carriers 60.

The communication configuration may implement a timing advance when receiving messages at block 112 and at block 118. The timing advance may help compensate for a delay seen by the base station 50 and/or to compensate for receiving messages in less time than expected. Indeed, the user equipment 52 may compute a timing advance for the second component carrier 60 based on timing differences between a receive time of a packet transmitted using the first component carrier 60 and a receive time of a packet transmitted using the second component carrier 60. Differences in the receive times may be caused by differences in physical location of the base stations 50 when the first component carrier 60 and the second component carrier 60 are associated with different base stations 50, however other factors may cause differences in receive times when the first component carrier 60 and the second component carrier 60 are associated with a same base station 50, such as differences in processing times and/or differences in equipment aging contributing to delays between component carriers 60. Applying a timing advance (TA) to the communication schedule of the communication configuration may compensate for a receive delay between the component carriers 60. Determining a timing advance may also facilitate determining UL allocation grants, since a timing advance adjusts scheduled allocations to better align symbols used to organize communication allocations, such that simultaneous uplink operations and downlink operations are avoided in systems that are unable to perform simultaneous uplink and downlink.

At block 126, when the Pcell switch and/or any Scell switching is complete, the user equipment 52 and the base station 50 resume communications. The communications may resume at an uplink allocation or at a downlink allocation corresponding to when operations were first paused at block 110 and block 111. The communications may involve using the second component carrier 60 (e.g., including the frequency range F2) as the Pcell and using the first component carrier 60 (e.g., including the frequency range F1) as the Scell To elaborate on switching operations performed without RACH-based communications, FIG. 10 is a flow chart of operations performed by the user equipment 52 and one or more base stations 50 when performing a RACH-less switching operational flow. For example, when using the RACH-less operational flow, each communication link associated with switching Pcells, PScells, and/or Scells is dropped between the one or more base stations 50 and the user equipment 52 before being re-established. The core network 62 may initiate the primary cell switch, such as in response to an instruction from a network provider, by instructing a first component carrier 60 assigned to be the primary cell to transmit an uplink grant message (e.g., UL grant message) to the user equipment 52 that includes a Handover (HO) initiation command indicating updated Pcell, PScell, and/or Scell assignments. In response to receiving the UL grant message, the user equipment 52 may skip performing a RACH procedure and may detach from ongoing Pcell, PScell, and/or Scell assignments and may generate a RRC reconfiguration complete message in the allocation portion of UL grant message. The user equipment 52 may transmit the RRC reconfiguration complete message (e.g., returned as part of the UL grant message packet) using the updated Pcell, PScell, and Scell assignments previously indicated in the HO initiation command.

Indeed, FIG. 10 is a flow diagram of a method 138 for operating the base station 50 and the user equipment 52 to coordinate a Pcell switch between component carriers 60, according to embodiments of the present disclosure. It is noted that, although depicted in a particular order, the blocks of the method 138 may be performed in any suitable order, and at least some blocks may be skipped altogether. As described herein, the method 138 is described as performed by the user equipment 52 and by the base station 50, however, it should be understood that any suitable processing and/or control circuitry may perform some or all of the operations of the method 138, such as one or more of the processors 12, the core network 62, or the like.

Referring briefly back to FIG. 9 in reference to FIG. 10, operations of block 98, block 100, block 102, block 104, block 106, and block 108 may be the same or similar as in the method 96. At block 140, the base station 50 transmits a handover initiation packet to the user equipment 52 to start the Pcell switch. The handover initiation packet may include an identifier to communicate to the user equipment 52 to perform a RACH-less switch. The user equipment 52 may make a connection to the new Pcell (e.g., the second component carrier 60) after detaching from the current Pcell (e.g., the first component carrier 60). In response to receiving the handover initiation packet, the user equipment 52 may prepare to perform the Pcell switch in its systems (e.g., hardware, software).

Indeed, at block 142, the user equipment 52 detaches from the first component carrier 60 as the Pcell before attaching to the second component carrier 60 as the Pcell. To do so, the user equipment 52 switches, at block 144, MAC entities (e.g., identifiers, configurations) from the first component carrier 60 (F1) to the second component carrier 60 (F2) (e.g., switch MAC entities from F1 to F2) and selects an uplink beam (e.g., frequency range) for the second component carrier 60 as the Pcell.

Since information exchanged at block 98 instructed the user equipment 52 and the base station 50 to not use RACH operations, the user equipment 52 determines any timing advances itself and transmits the determined timing advances to the base station 50 for implementation in the communication configuration. The user equipment 52 may compute a timing advance for the second component carrier 60 based on timing differences (e.g., delays) between a receive time of a packet transmitted using the first component carrier 60 and a receive time of a packet transmitted using the second component carrier 60, such as during operations corresponding to block 106. The timing advance may help compensate for a delay seen by the base station 50 and/or to compensate for receiving messages in less time than expected. To do so, the user equipment 52 may retain at least some record in memory 56C of a most recent arrival time for each component carrier 60, where differences between arrival times of packets may be used to determine a delay (e.g., difference) between the arrival times. Furthermore, the user equipment 52 may use downlink measurements of reference signals of the second component carrier 60, such as single sideband (SSB) signals and/or power measurements, channel state information reference signals, or the like, to select an uplink beam (e.g., frequency range). In some embodiments, the user equipment 52 may use a previous uplink allocation that was used by the second component carrier 60 when previously assigned as a Scell, and thus reassign these parameters in memory to be associated with the Pcell.

Once the Pcells are switched, at block 146, the user equipment 52 transmits a handover completion notification to the base station 50. Transmission of the handover completion notification occurs similar to operations of block 118. The handover completion notification may also include indications of the determined UL allocation grants that are to be applied to the communication schedules determined at block 144. In this way, the handover completion notification indicates to the base station 50 specific timing allocations (e.g., timing advances) determined by the user equipment 52 that compensate for timing differences between the component carriers 60. By performing at least some of the above described operations, the base station 50 may avoid performing a RACH procedure to determine the timing advance (since the user equipment 52 determines the timing advance and sends it to the base station 50) and may transmit an RRC reconfiguration complete message in the handover completion notification that includes the allocated UL grant. In this way, the handover completion notification may also signal to the base station 50 that RRC reconfiguration is complete at the user equipment 52.

In response to the completion of the Pcell switch (e.g., completion of the RRC reconfiguration), the base station 50 may activate the first component carrier 60 as the Scell and initiate communication with the user equipment 52. Indeed, the operations of block 120, block 122, block 124, and block 126 are repeated as described in method 96 of FIG. 9. It is noted that the communication configuration transmitted at block 124 may include a communication schedule that accommodates any timing advance determined by the user equipment 52 at block 144 and indicated by the user equipment 52 at block 146. In this way, the communication configuration may have uplink and/or downlink allocations shifted relative to allocations previously used when the first component carrier 60 was assigned as the Pcell.

In some cases, a Pcell switch may reference defined switching parameters. That is, in response to receiving the handover initiation packet from the base station 50, the user equipment 52 may use a predefined or preconfigured sequence of operations to switch the Pcells without having to transmit and/or receive Pcell switching information from the base station 50 beyond information included in a handover initiation packet. To elaborate further, FIG. 11 is a flow chart of operations performed by the user equipment 52 and one or more base stations 50 when performing switching operations that use switching parameters. Indeed, FIG. 11 is a flow diagram of a method 158 for operating the base station 50 and the user equipment 52 to coordinate a Pcell switch between component carriers 60, according to embodiments of the present disclosure. It is noted that, although depicted in a particular order, the blocks of the method 158 may be performed in any suitable order, and at least some blocks may be skipped altogether. As described herein, the method 158 is described as performed by the user equipment 52 and by the base station 50, however, it should be understood that any suitable processing and/or control circuitry may perform some or all of the operations of the method 138, such as one or more of the processors 12, the core network 62, or the like.

Referring briefly back to FIG. 9 in reference to FIG. 10, operations of block 98, block 100, block 102, block 104, block 106, and block 108 may be the same as in the method 96 and the method 138. It is noted that information exchanged at block 98 may include, in this case, at least an indication to the user equipment 52 to use a defined sequence of switching operations in response to receiving a handover initiation packet.

At block 160, the base station 50 transmits a handover initiation packet to the user equipment 52 to start the Pcell switch. The information included in the handover initiation packet may at least include an indication to use a defined sequence of handover methods with the user equipment 52 that follows a known timeline and/or takes a known or estimated duration of time to complete.

The base station 50 may use a variety of suitable signaling techniques, including physical (PHY) layer signals, MAC layer signals (e.g., MAC CE), RRC signaling, or the like, as part of downlink control information (DCI) transmitted as a DCI command. In this way, the base station 50 may transmit the handover initiation packet as a radio resource control (RRC) protocol message in response to receiving a medium access control (MAC) protocol message, a message transmitted via a physical layer signaling, or the like. Furthermore, in some cases, the base station 50 may transmit the handover initiation packet in response to receiving a control signal from the controller 54 (e.g., controller 54A, controller 54B) of the base station 50 or another base station 50, according to timing parameters or on a timing schedule maintained by the controller 54 for managing Pcell switching operations and/or non-simultaneous uplink operations.

The user equipment 52 may access one or more identifiers transmitted as part of the handover initiation packet to determine to perform the Pcell switch. For example, when physical layer signaling is used, a 1-bit indication may be accessed by the user equipment 52 and may simultaneously communicate that the Pcell switch should be performed and that the second component carrier 60 is the target component carrier 60 to assign as the new Pcell. In some cases, the handover initiation packet may also include an identifier to communicate to the user equipment 52 that a RACH-less switch should be performed (and thus operations of FIG. 10 should be followed), a make-before-break switch (and thus operations of FIG. 9 should be followed), or both. Indeed, the example operations of FIG. 9 and FIG. 10 may be combined to perform a RACH-less MBB switch by waiting to perform operations of block 142 until after performing operations of block 144 when switching Pcells according to defined switching operations (e.g., performing operations of block 162). The user equipment 52 may make a connection to the new Pcell (e.g., second component carrier 60) before or after detaching from the current Pcell (e.g., first component carrier 60) based on what operational mode is indicated by the handover initiation packet (e.g., MBB handover operational mode, RACH-less handover operational mode). The base station 50 may also include a Pcell switch pattern with the handover initiation packet transmission and/or otherwise indicate to the user equipment 52 to access a stored Pcell switch pattern to perform a determined switching operation. The Pcell switch pattern may correspond to defined set of operations to be performed according to parameters indicated in the handover initiation packet in response to receiving the handover initiation packet. Indeed, the Pcell switch pattern may provide a sequence of operations and/or parameters to be implemented by the user equipment 52 when instructed to perform a Pcell switch.

At block 162, in response to receiving a Pcell switch command via the handover initiation packet from the base station 50, for example, the user equipment 52 switches the Pcells by executing a defined switching sequence (e.g., the Pcell switch pattern). Operations performed by the user equipment 52 include detaching from the first component carrier 60 as the Pcell, attaching to second component carrier 60 as the Pcell, resetting a MAC entity for the Pcell, setting the MAC entity and/or transceiver 58 corresponding to the Pcell to parameters corresponding to the second component carrier 60 (e.g., center frequency, bandwidth, frequency ranges, communication amplitudes for signals), selecting an uplink beam for the Pcell based on the second component carrier 60 (e.g., based on previous timing advances and/or UL allocations used for the second component carrier 60 when previously assigned as a Scell), or the like. It is noted that these listed operations may be performed in a different order, and, for example, may enable the user equipment 52 to attach to the second component carrier 60 as the Pcell before detaching from the first component carrier 60 (e.g., per an MBB switch). Since the sequence of operations for the Pcell switch may be known by the base station 50 before performance of the Pcell switch, the base station 50 may know how long to wait before activating the first component carrier 60 as the Scell to give the user equipment 52 time to complete the Pcell switch. In this way, the base station 50 may wait to communicate a message via the switched Pcell for a determined duration of time (e.g., a duration of time enabling completion of the sequence of operations) as opposed to waiting until receiving a handover completion notification (e.g., as occurs in the method 138). Once the determined duration of time passes after transmission of the Pcell switch command, the base station 50 may drop previous communication links as new communication links (e.g., new Pcell, PScell, and/or Scell assignments) have been established, thereby completing the Pcell switch.

Thus, at block 164, after the determined duration of time passes corresponding to an amount of time used by the user equipment 52 to complete the Pcell switch, the base station 50 may activate the first component carrier 60 as the Scell and transmit a MAC command to the user equipment 52 (e.g., switch the Scell from the second component carrier 60 to the first component carrier 60). At block 122, the user equipment 52 receives the MAC command from the base station 50, and continues to finalize assignment of the second component carrier 60 as the Scell. The operations of block 122, block 124, and block 126 may be the same as in the method 96 and the method 138.

In some embodiments, center frequencies used to define component carriers 60 may remain constant during the Pcell switching. For example, the first component carrier 60 may have a same center frequency and a same bandwidth when assigned as a Pcell as when assigned as a Scell. When switching is performed in cases where the center frequencies and/or other parameters are constant over the Pcell switching, these properties may be copied and referenced to complete the switching in lieu of repeating beamforming operations, or the like. This may result in a more efficient Pcell switching since existing configurations are exchanged between Pcell assignments and Scell assignments (e.g., exchanged in memory and/or in data processing circuitry used to process incoming or outgoing signals), avoiding redetermining and/or recalibrating to the center frequency.

It is noted that component carriers 60 may operate contiguously in a same frequency band (e.g., referred to as intra-band contiguous carrier aggregation), non-contiguously in a same frequency band but separated by one or more frequency gaps (e.g., referred to as intra-band non-contiguous carrier aggregation), and/or in different frequency bands (e.g., inter-band carrier aggregation). The base stations 50 may receive and/or transmit downlink control information (DCI) to/from user equipment 52. The DCI may include information used to schedule downlink data channel (e.g., Physical Downlink Shared Channel (PDSCH)) and/or to schedule uplink data channels (e.g., Physical Uplink Shared Channel (PUSCH)). Additionally or alternatively, the base stations 50 may receive a media access control (MAC) protocol address that uniquely identifies a network interface controller (NIC), and which may be used as a network address in communications within a network segment, such as to identify communications to and/or from the user equipment 52. The base stations 50 may use processes, such as Radio Resource Control (RRC) protocol processes, to transmit messages between base stations 50 of a radio network (e.g., wireless network provided by base stations 50) and/or between the user equipment 52. Furthermore, the base stations 50 may include an access management device that performs operations, such as Access and Mobility Management Functions (AMF), associated with deployment of the radio network (e.g., wireless network, cellular network, core network of a cellular service provider). The access management device may also perform operations associated with registering and/or maintain information associated with user devices accessing and/or attempting to access the radio network, such as User Plane Functions (UPF). In this way, access management device of each base station 50 may access permissions associated with SIM cards of the user equipment 52 when registering the user equipment 52 to the wireless network.

Technical effects of the present disclosure include systems and methods for operating components of a network (e.g., base stations, user equipment) to transmit or receive signals on various frequency ranges dynamically changed between Pcell, PScell, and Scell assignments. A network provider using dual networks, such as using both a 4G/LTE network and a 5G/NR network, may benefit from switching the Pcell, PScell, and/or a Scell between different frequency range assignments. Indeed, dynamically adjusting which frequency ranges are used for Pcells, PScells, and Scells may enable flexible allocation of bandwidths and/or amounts of resources to user equipment. For example, changing the Pcell and/or PScell assignments may enable some user equipment of the network to use less than an allocated bandwidth, while other user equipment use more than an allocated bandwidth. Dynamically allocating bandwidth by reallocating cell assignments between user equipment may more efficiently distribute bandwidth to meet or address the demands of the network, which may result in an overall reduction of resources used by the network provider to deploy the network.

To do so, user equipment may indicate its capability to perform the switching operation associated with a Pcell, PScell, and/or Scell change to a network provider. In response to receiving this information, the network provider may cause one or more base stations to initiate a "make before break" handover (MBB handover) and/or a random-access channel-less (RACH-less) handover between the serving cells. In some cases, the switching operations associated with the MBB handover or the RACH-less handover may be performed in addition to a defined sequence of operations that confirm switching operations are being performed without having a network provider exchange intermediate confirmation messages with the user equipment. When performing the switch, the network provider may reuse previous frequency assignments and/or configurations to reduce an amount of time spent performing the BWP switching overall, thus improving deployment of the switching in addition to increasing flexibility of the BWP switching operations.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method for operating user equipment, comprising:
communicating with a base station using a first frequency range assigned as a primary cell associated with bandwidth parts switching;
receiving a handover initiation packet from the base station using the first frequency range;
assigning a second frequency range as the primary cell based on a parameter indicated in the handover initiation packet in response to receiving the handover initiation packet;
receiving a control packet from the base station using the second frequency range as the primary cell;
assigning the first frequency range as a secondary cell in response to receiving the control packet from the base station; and
communicating with the base station using the first frequency range as the secondary cell and the second frequency range as the primary cell.

2. The method of claim 1, comprising:
determining a timing advance associated with a time delay between a first signal received using the first frequency range and a second signal received using the second frequency range;
transmitting the timing advance to the base station; and
communicating with the base station based at least in part on the timing advance.

3. The method of claim 1, comprising receiving an indication of a media access control (MAC) message from the base station, the MAC message comprising configuration data for assigning the first frequency range as the secondary cell.

4. The method of claim 1, comprising:
receiving a communication configuration using the first frequency range; and
communicating with the base station according to the communication configuration using the first frequency range, the second frequency range, or both.

5. The method of claim 4, wherein communicating with the base station comprises receiving a downlink communication from the base station during a time period indicated by the communication configuration.

6. The method of claim 1, comprising detaching from the first frequency range as the primary cell after assigning the second frequency range as the primary cell.

7. The method of claim 1, comprising:
transmitting a random access channel preamble to the base station using the second frequency range as the primary cell;
receiving a random access response as the control packet from the base station generated in response to the base station receiving the random access channel preamble; and
transmitting a handover completion notification in response to receiving the random access response from the base station and in response to assigning the first frequency range as the secondary cell.

8. The method of claim 1, comprising:
assigning the second frequency range as the primary cell before detaching from the first frequency range as the primary cell; and
transmitting a handover completion notification to the base station using the second frequency range after assigning the second frequency range as the primary cell.

9. The method of claim 1, comprising transmitting a handover completion notification to the base station without receiving a random access response from the base station.

10. The method of claim 1, the first frequency range corresponding to a subset of frequencies between 600 megahertz (MHz) and 700 MHz, between 2.5 gigahertz (GHz) and 3.7 GHz, between 25 GHz and 42 GHz, or any combination thereof.

11. User equipment comprising:
a transmitter;
a receiver; and
one or more processors communicatively coupled to the transmitter and the receiver, the one or more processors being configured to
operate the receiver to receive a handover initiation packet using a first frequency range as a primary cell from a base station,
adjust the receiver and the transmitter to use a second frequency range as the primary cell,
operate the transmitter to transmit a random access channel packet to the base station using the second frequency range as the primary cell,
adjust the receiver and the transmitter to detach from the first frequency range as the primary cell and reset, in a transport layer, information corresponding to the first frequency range,
operate the receiver to receive a random access response packet using the second frequency range as the primary cell from the base station, and
operate the transmitter to transmit a handover completion notification to the base station in response to receiving the random access response packet using the second frequency range as the primary cell.

12. The user equipment of claim 11, wherein the one or more processors are further configured to adjust the receiver and the transmitter to detach from the first frequency range as the primary cell after adjusting the receiver and the transmitter to use a second frequency range as the primary cell.

13. The user equipment of claim 12, the first frequency range corresponding to a subset of frequencies between 600 megahertz (MHz) and 700 MHz, between 2.5 gigahertz (GHz) and 3.7 GHz, between 25 GHz and 42 GHz, or any combination thereof.

14. The user equipment of claim 12, wherein the one or more processors are further configured to:
operate the receiver to receive a random access response;
operate the transmitter to transmit a handover completion message in response to receiving the random access response;
operate the receiver to receive control information from the base station using the second frequency range as the primary cell; and
adjust the receiver and the transmitter to use the first frequency range as a secondary cell based at least in part on the control information.

15. The user equipment of claim 14, the control information comprising one or more medium access control (MAC) layer signals.

16. The user equipment of claim 11, wherein the one or more processors are further configured to:
adjust the receiver and the transmitter to use the first frequency range as a secondary cell at least in part by assigning, in the transport layer, the first frequency range as the secondary cell in response to receiving a media access control address packet;
operate the receiver to receive a communication configuration from the base station, the communication configuration comprising indications of uplink allocations and downlink allocations to be observed by the one or more processors for the first frequency range, the second frequency range, or both, the first frequency range and the second frequency range each corresponding to a respective component carrier;
operate the receiver to receive signals using the first frequency range, the second frequency range, or both, when a next communication period indicated by the communication configuration comprises a downlink allocation; and
operate the transmitter to transmit signals using the first frequency range, the second frequency range, or both, when the next communication period indicated by the communication configuration comprises an uplink allocation.

17. User equipment comprising:
a transmitter configured to transmit signals in a first frequency range;
a receiver configured to receive a handover initiation packet using the first frequency range as a primary cell from a base station; and
one or more processors communicatively coupled to the transmitter and the receiver, and configured to perform a defined sequence of operations including
adjusting the receiver and the transmitter to detach from the first frequency range as the primary cell and reset, in a transport layer, information corresponding to the first frequency range,
adjusting the receiver and the transmitter to configure circuitry to use a second frequency range as the primary cell,
operating the receiver to receive a control packet using the second frequency range as the primary cell from the base station, and
adjusting the receiver and the transmitter to use the first frequency range as a secondary cell at least in part by assigning, in the transport layer, the first frequency range as the secondary cell in response to the control packet.

18. The user equipment of claim 17, the handover initiation packet being transmitted by the base station as a radio resource control (RRC) protocol message in response to a receiving a medium access control (MAC) protocol message, a message transmitted via a physical layer signaling, a control signal, according to timing parameters or on a timing schedule, or any combination thereof.

19. The user equipment of claim 17, the defined sequence of operations being performed in a duration of time, and the one or more processors being configured to adjust operation of the receiver and the transmitter in response to the base station transmitting control information after the duration of time passes from the base station transmitting the handover initiation packet.

20. The user equipment of claim 17, the first frequency range corresponding to a subset of frequencies between 600 megahertz (MHz) and 700 MHz, between 2.5 gigahertz (GHz) and 3.7 GHz, between 25 GHz and 42 GHz, or any combination thereof.

21. A user equipment comprising:
a transmitter;
a receiver; and
one or more processors communicatively coupled to the transmitter and the receiver and configured to
operate the receiver to receive a handover initiation packet using a first frequency range as a primary cell from a base station,
adjust the receiver and the transmitter to detach from the first frequency range as the primary cell and reset, in a transport layer, information corresponding to the first frequency range,
after detachment in the transport layer, adjust the receiver and the transmitter to use a second frequency range as the primary cell,
operate the transmitter to transmit a handover completion notification to the base station using the second frequency range as the primary cell,
operate the receiver to receive a control packet using the second frequency range as the primary cell from the base station, and
adjust the receiver and the transmitter to use the first frequency range as a secondary cell at least in part by assigning, in the transport layer, the information corresponding to the first frequency range as the secondary cell in response to the control packet.

* * * * *